United States Patent
Park et al.

(10) Patent No.: US 10,595,310 B2
(45) Date of Patent: Mar. 17, 2020

(54) METHOD AND APPARATUS FOR TRANSCEIVING DATA IN WIRELESS COMMUNICATION SYSTEM

(71) Applicant: LG ELECTRONICS INC., Seoul (KR)

(72) Inventors: Jonghyun Park, Seoul (KR); Joonkui Ahn, Seoul (KR); Hanbyul Seo, Seoul (KR); Seungmin Lee, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/324,676

(22) PCT Filed: Jul. 6, 2015

(86) PCT No.: PCT/KR2015/006931
§ 371 (c)(1),
(2) Date: Jan. 6, 2017

(87) PCT Pub. No.: WO2016/006890
PCT Pub. Date: Jan. 14, 2016

(65) Prior Publication Data
US 2017/0208588 A1    Jul. 20, 2017

Related U.S. Application Data

(60) Provisional application No. 62/021,689, filed on Jul. 7, 2014.

(51) Int. Cl.
*H04L 1/00*    (2006.01)
*H04L 1/18*    (2006.01)
(Continued)

(52) U.S. Cl.
CPC ....... *H04W 72/0446* (2013.01); *H04L 1/0038* (2013.01); *H04L 1/1887* (2013.01);
(Continued)

(58) Field of Classification Search
CPC ... H04L 27/2675; H04L 7/00; H04L 27/2656; H04L 25/0238; H04L 1/0038;
(Continued)

(56) References Cited

U.S. PATENT DOCUMENTS

2009/0197535 A1*  8/2009  Roh ............. H04B 7/015
                                           455/62
2009/0262699 A1   10/2009  Wengerter et al.
(Continued)

FOREIGN PATENT DOCUMENTS

CN    103580840    2/2014
CN    103621130    3/2014
(Continued)

OTHER PUBLICATIONS

International Application No. PCT/KR2015/006931, Search Report dated Oct. 28, 2015, 4 pages.
(Continued)

*Primary Examiner* — Moo Jeong
(74) *Attorney, Agent, or Firm* — Lee Hong Degerman Kang Waimey

(57) ABSTRACT

Disclosed herein are a method and apparatus for sending and receiving data in a wireless communication system. More specifically, a method for sending and receiving, by UE, data in an unlicensed band in a wireless communication system may include performing blind detection for detecting a predetermined specific signal transmitted by an eNB in a cell of an unlicensed band and determining a period in which the signal is detected through the blind detection to be a reserved resource period (RRP) which is a time period secured for the
(Continued)

transmission and reception of data in the cell of the unlicensed band.

17 Claims, 18 Drawing Sheets

(51) Int. Cl.
*H04L 25/02* (2006.01)
*H04L 27/26* (2006.01)
*H04L 5/00* (2006.01)
*H04L 7/00* (2006.01)
*H04W 72/00* (2009.01)
*H04W 72/04* (2009.01)
*H04W 72/08* (2009.01)

(52) U.S. Cl.
CPC .............. *H04L 5/0048* (2013.01); *H04L 7/00* (2013.01); *H04L 25/0238* (2013.01); *H04L 27/26* (2013.01); *H04L 27/2656* (2013.01); *H04L 27/2675* (2013.01); *H04W 72/005* (2013.01); *H04W 72/042* (2013.01); *H04W 72/085* (2013.01)

(58) Field of Classification Search
CPC ..... H04L 5/0048; H04L 1/1887; H04L 27/26; H04W 72/0446; H04W 72/085; H04W 72/005; H04W 72/042
See application file for complete search history.

(56) References Cited

U.S. PATENT DOCUMENTS

| | | | |
|---|---|---|---|
| 2012/0207033 | A1 | 8/2012 | Hakola et al. |
| 2014/0036853 | A1 | 2/2014 | Kim et al. |
| 2014/0086293 | A1* | 3/2014 | Koike ................ H04B 17/0045 375/224 |
| 2014/0161002 | A1* | 6/2014 | Gauvreau ............. H04W 16/24 370/280 |
| 2014/0301303 | A1* | 10/2014 | Roman ................ H04L 5/0073 370/329 |
| 2014/0378157 | A1* | 12/2014 | Wei ....................... H04W 16/14 455/454 |
| 2015/0189574 | A1* | 7/2015 | Ng ........................ H04W 24/08 370/252 |
| 2015/0280847 | A1* | 10/2015 | Somasundaram ... H04J 11/0056 370/252 |
| 2015/0365152 | A1* | 12/2015 | Frenne ................ H04B 7/0626 370/252 |
| 2016/0301504 | A1* | 10/2016 | Toskala ................ H04W 48/16 |

FOREIGN PATENT DOCUMENTS

| | | |
|---|---|---|
| CN | 103765824 | 4/2014 |
| WO | 2013006988 | 1/2013 |
| WO | 2013112983 | 8/2013 |
| WO | 2013161135 | 10/2013 |
| WO | 2014047235 | 3/2014 |
| WO | 2014088295 | 6/2014 |

OTHER PUBLICATIONS

Japan Patent Office Application No. 2016-573573, Office Action dated Jan. 12, 2018, 5 pages.
The State Intellectual Property Office of the People's Republic of China Application Serial No. 201580037076.4, Office Action dated Jun. 25, 2019, 4 pages.

* cited by examiner

[FIG. 8]
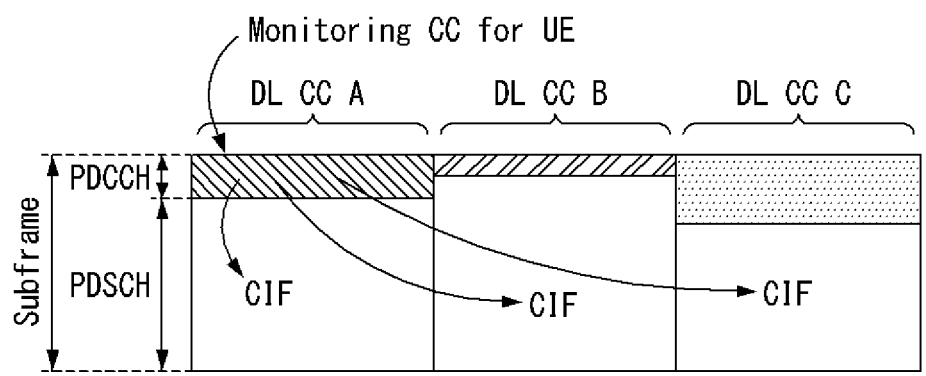
[FIG. 9]
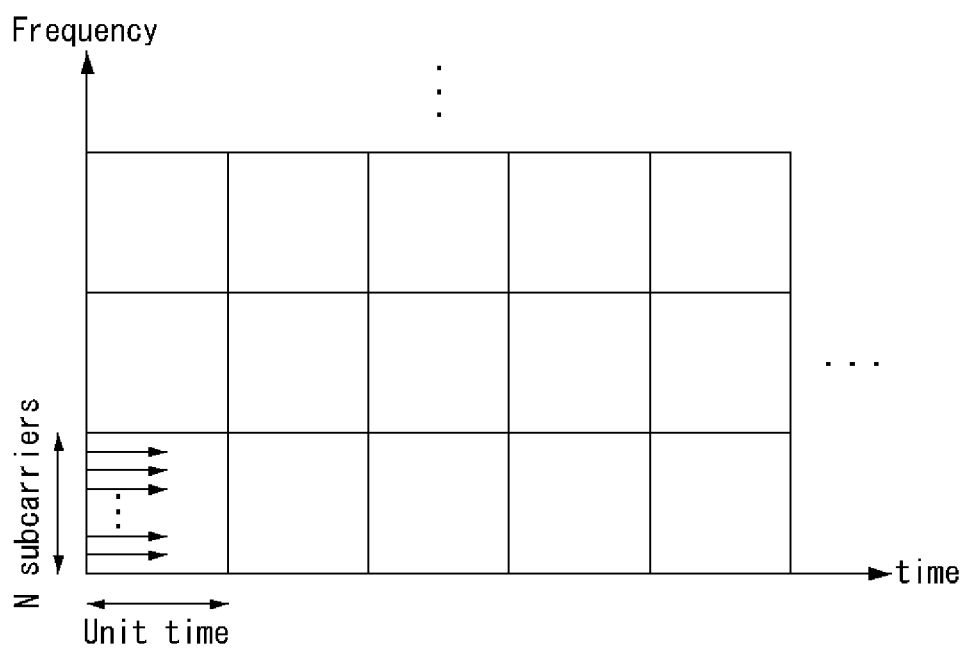

FIG. 13
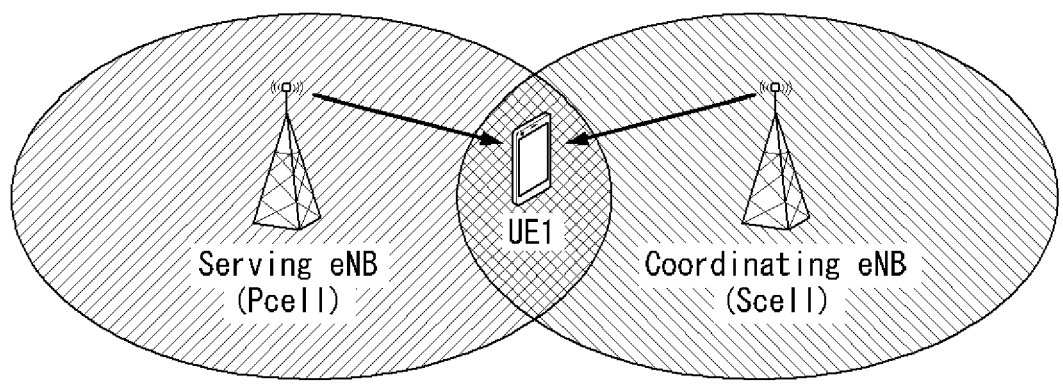
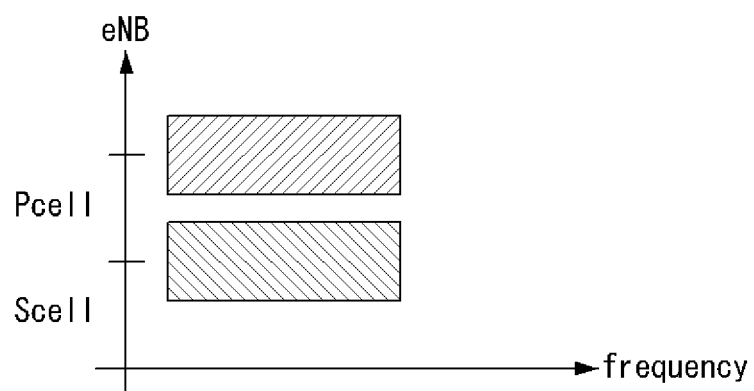

FIG. 14
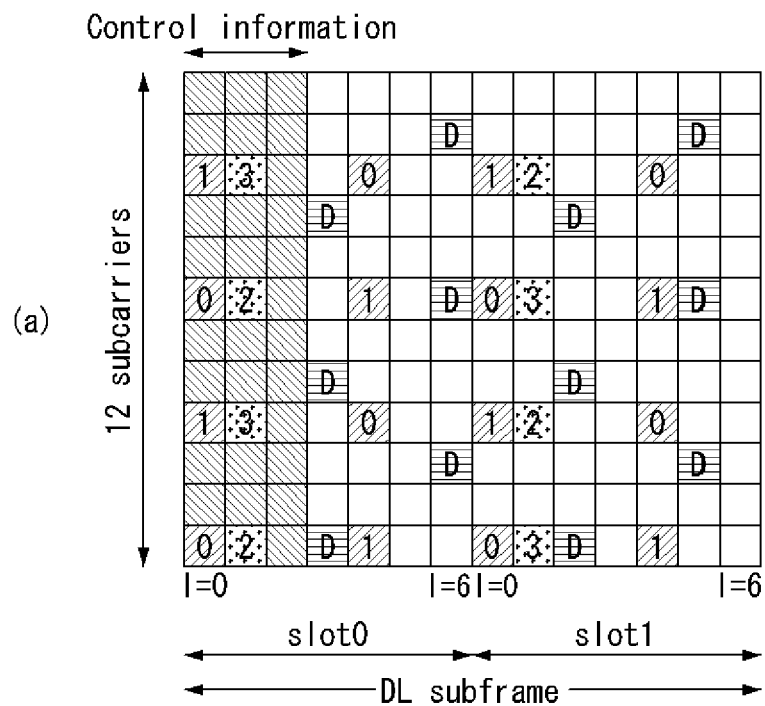
(a)
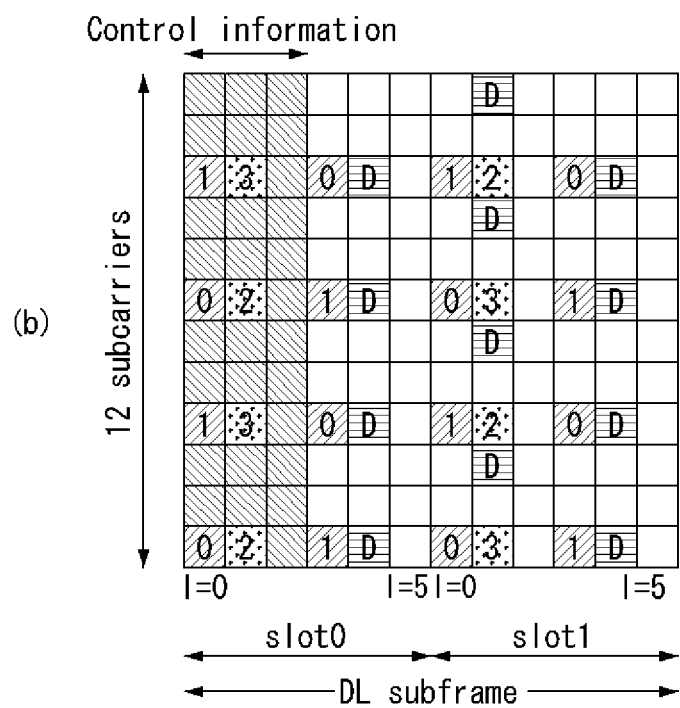
(b)

METHOD AND APPARATUS FOR TRANSCEIVING DATA IN WIRELESS COMMUNICATION SYSTEM

CROSS-REFERENCE TO RELATED APPLICATIONS

This application is the National Stage filing under 35 U.S.C. 371 of International Application No. PCT/KR2015/006931, filed on Jul. 6, 2015, which claims the benefit of U.S. Provisional Application No. 62/021,689, filed on Jul. 7, 2014, the contents of which are all hereby incorporated by reference herein in their entirety.

TECHNICAL FIELD

The present invention relates to a wireless communication system and, more particularly, to a method for sending and receiving data in an unlicensed band and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

In 3GPP, as mobile communication data traffic explosively increases, a service in an unlicensed band/spectrum has been suggested as one of schemes for satisfying the explosive increase of mobile communication data traffic. In this case, in order to send and receive data in an unlicensed band/spectrum, it is necessary to minimize an influence on other communication systems (e.g., an 802.11 system) and to occupy a corresponding band through a contention, but such a method has not yet been defined.

An embodiment of the present invention proposes a method for sending and receiving data between UE and an eNB in an unlicensed band/spectrum.

Furthermore, an embodiment of the present invention proposes a method for determining a time period in which radio resources have been occupied in order to send and receive data by performing blind detection on a specific signal in an unlicensed band/spectrum.

Furthermore, an embodiment of the present invention proposes a method for performing, by UE, a restricted measurement operation in a time period occupied in an unlicensed band/spectrum.

Technical objects to be achieved by the present invention are not limited to the aforementioned objects, and those skilled in the art to which the present invention pertains may evidently understand other technical objects from the following description.

Technical Solution

In an aspect of the present invention, a method for sending and receiving, by UE, data in an unlicensed band in a wireless communication system may include performing blind detection for detecting a predetermined specific signal transmitted from an eNB in a cell of an unlicensed band and determining a period in which the signal is detected through the blind detection to be a reserved resource period (RRP) which is a time period occupied for the transmission and reception of data in the cell of the unlicensed band.

In another aspect of the present invention, user equipment for sending and receiving data in an unlicensed band in a wireless communication system includes a radio frequency (RF) unit configured to send and receive a radio signal and a processor configured to control the user equipment. The processor may perform blind detection for detecting a predetermined specific signal transmitted by an eNB in a cell of an unlicensed band and may determine a period in which the signal is detected through the blind detection to be a reserved resource period (RRP) which is a time period occupied for the transmission and reception of data in the cell of the unlicensed band.

The method may further include receiving RRP configuration information including a parameter for the blind detection of a reference signal (RS) and/or for determining the RRP from the eNB.

The RRP configuration information may include one or more of the sequence scrambling initialization parameter of the signal, information for identifying a radio frame boundary in the cell of the unlicensed band, information about the transmission bandwidth of the signal, information about a power level threshold for the RRP determination, the number of antenna ports in which the signal is transmitted, a multicast-broadcast single-frequency network (MBSFN) subframe configuration, a reference signal capable of a QCL assumption, and the large-scale property of a wireless channel.

If the power level threshold is set in a subframe unit, a subframe whose average received power value of resource elements in which the signal is transmitted is greater than or equal to the power level threshold may be determined to belong to the RRP.

If the power level threshold is set in an orthogonal frequency division multiplexing (OFDM) symbol unit, a subframe in which the number of OFDM symbols whose average received power value of resource elements in which the signal is transmitted is greater than or equal to the power level threshold is greater than or equal to a specific number may be determined to belong to the RRP.

The reference signal capable of the QCL assumption may include a reference signal transmitted in a cell of a licensed band.

A Doppler shift value of the cell of the unlicensed band may be derived by correcting a Doppler shift estimation value estimated from the reference signal transmitted in the cell of the licensed band based on a ratio between the center frequency of the cell of the licensed band and the center frequency of the cell of the unlicensed band.

The boundary of a floating radio frame may be determined with respect to the cell of the unlicensed band from a point of time at which the signal is detected or after a specific time from the point of time at which the signal is detected.

The radio frame number of the cell of the unlicensed band may be sequentially increased at the same interval as the interval of a radio frame of a licensed band from the boundary of the floating radio frame regardless of the radio frame number of a cell of the licensed band.

The blind detection operation may be stopped for a specific time from a point of time at which the boundary of the floating radio frame is obtained by the blind detection.

If both the cell of the unlicensed band and a cell of a licensed band support a hybrid automatic retransmit request (HARQ) operation, the timeline of the HARQ may be determined based on the radio frame boundary of the cell of the licensed band.

Power boosting may be applied to a signal transmitted in a first subframe of the RRP.

The method may further include performing, by the UE, measurement using a reference signal transmitted from the eNB in a restricted measurement object within the RRP.

The restricted measurement object may be set by the eNB or determined to be a subframe in which average received power of the reference signal is greater than or equal to a specific threshold within the RRP.

If the RRP is a inconsecutive time period, the restricted measurement object may be determined to be a subframe in which average received power of the reference signal is greater than or equal to a specific threshold within the RRP within a specific time window.

Advantageous Effects

In accordance with an embodiment of the present invention, data can be transmitted and received while minimizing an influence on other wireless communication systems in an unlicensed band/spectrum.

Furthermore, in accordance with an embodiment of the present invention, a time period in which radio resources have been occupied can be flexibly determined and signaling related to a time period in which radio resources have been occupied can be minimized because UE determines a time period in which radio resources have been occupied in an unlicensed band/spectrum.

Furthermore, in accordance with an embodiment of the present invention, a restricted measurement operation for UE can be smoothly supported even in an unlicensed band/spectrum.

Advantages which may be obtained by the present invention are not limited to the aforementioned advantages, and various other advantages may be evidently understood by those skilled in the art to which the present invention pertains from the following description.

DESCRIPTION OF DRAWINGS

The accompanying drawings, which are included herein as a part of a description in order to help understanding of the present invention, provide embodiments of the present invention, and describe the technical features of the present invention with the description below.

FIG. 8 shows an example of the structure of a subframe according to cross-carrier scheduling in a wireless communication system to which an embodiment of the present invention may be applied.

FIG. 9 is a diagram illustrating a time-frequency resource block in a time frequency domain in a wireless communication system to which an embodiment of the present invention may be applied.

FIG. 13 is a diagram illustrating a carrier aggregation-based CoMP system in a wireless communication system to which an embodiment of the present invention may be applied.

FIG. 14 illustrates a reference signal pattern mapped to a downlink resource block pair in a wireless communication system to which an embodiment of the present invention may be applied.

MODE FOR INVENTION

Figure 1:
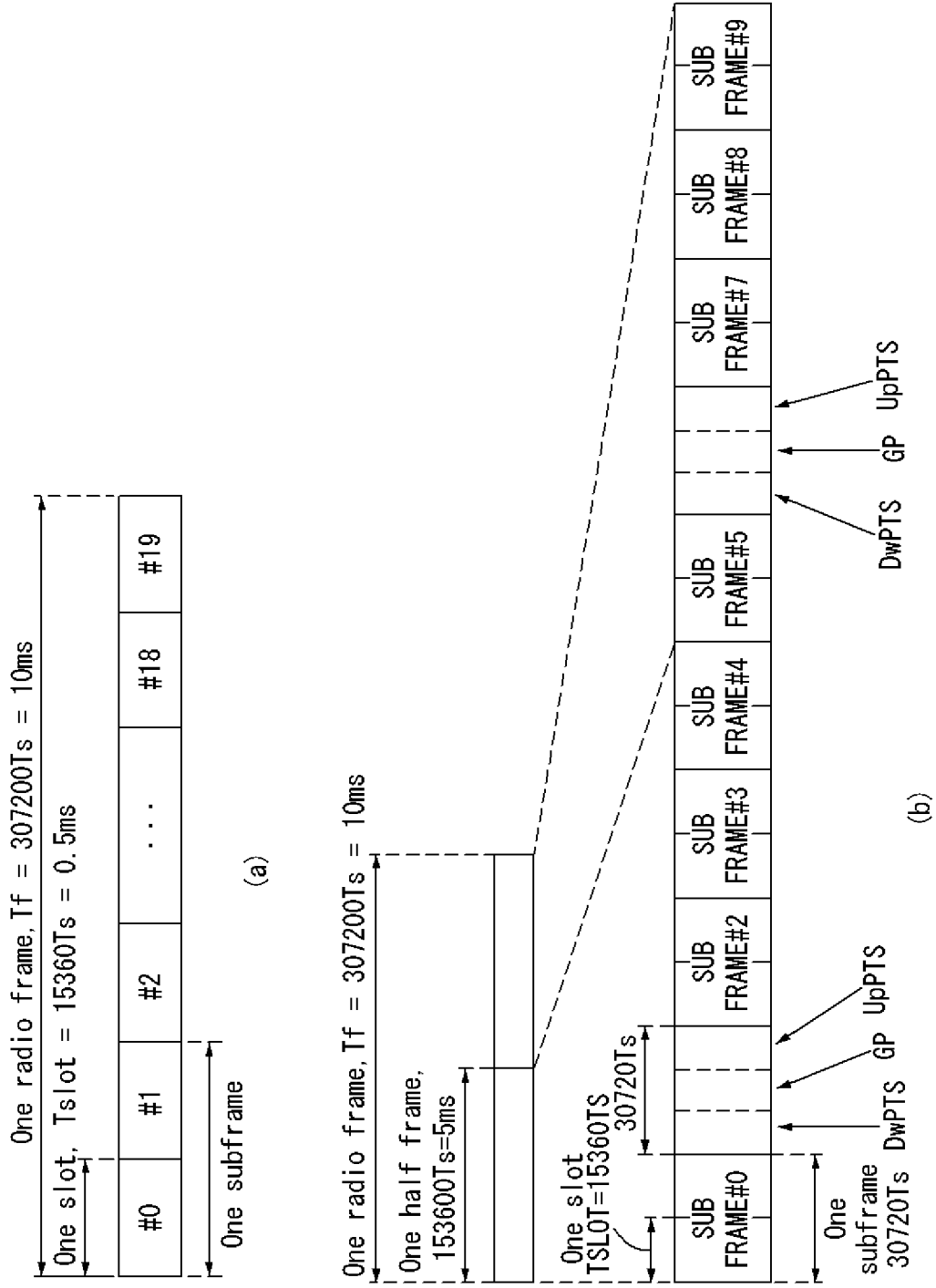
FIG. 1 illustrates the structure of a radio frame in a wireless communication system to which an embodiment of the present invention may be applied.

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RB s) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having T_slot=15360*T_s=0.5 ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

Table 2 shows the configuration (the length of a DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

Figure 2:
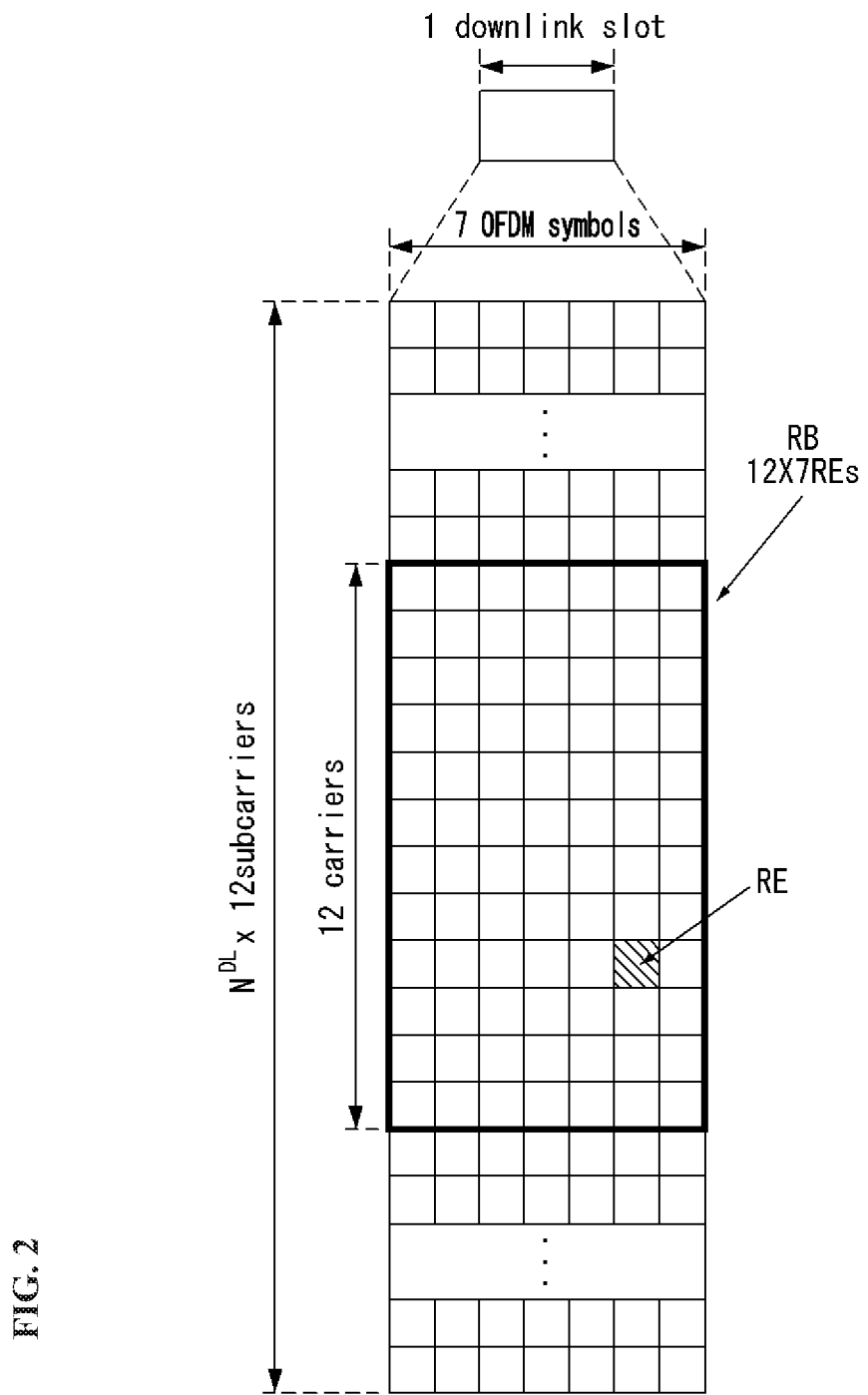
FIG. 2 is a diagram illustrating a resource grid for a downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
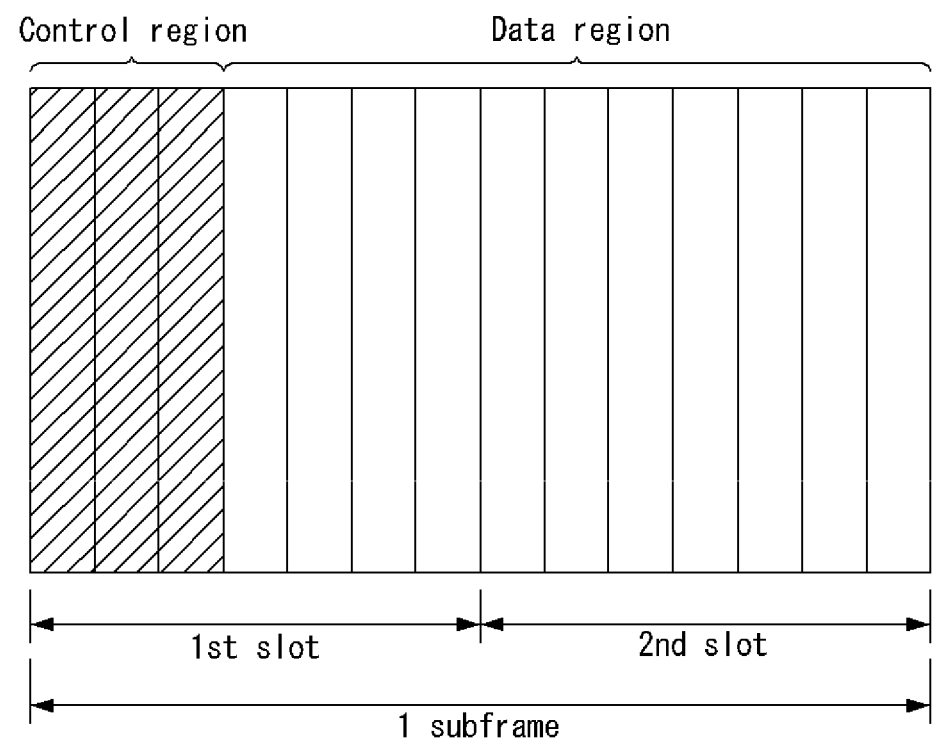
FIG. 3 illustrates the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

Figure 4:
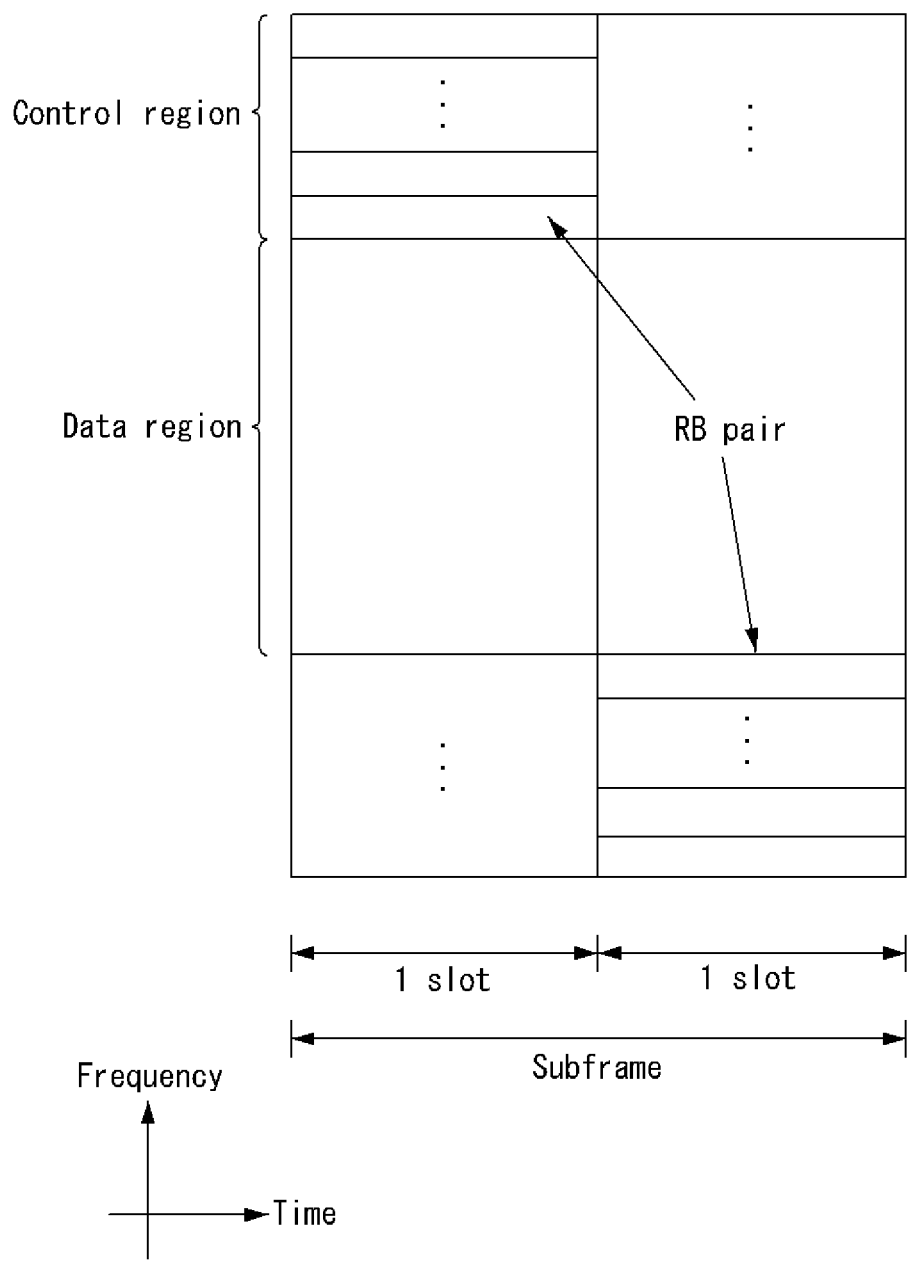
FIG. 4 illustrates the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
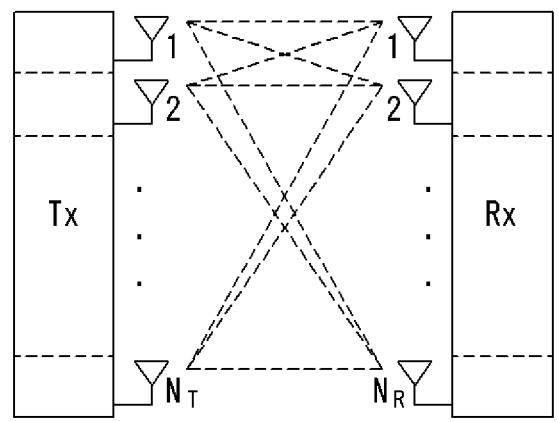
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas.

Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s=[s_1, s_2, \ldots, s_{N_T}]^T \quad \text{[Equation 2]}$$

Transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector having controlled transmission power in Equation 4 is multiplied by a weight matrix W, thus forming N_T transmission signals x_1, x_2, . . . , x_NT that are actually transmitted. In this case, the weight matrix W functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
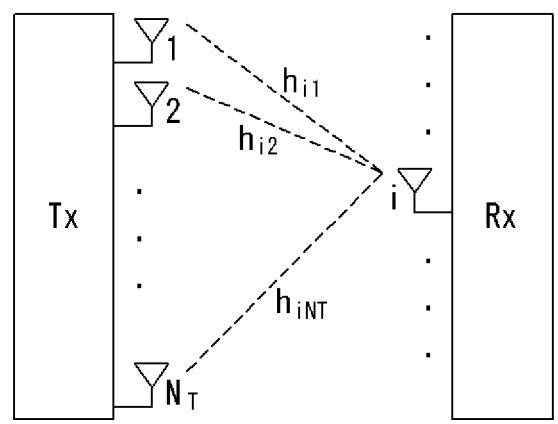
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1}, h_{i2}, \ldots, h_{iN_T}] \quad \text{[Equation 7]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

Additive white Gaussian noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

General Carrier Aggregation

A communication environment taken into consideration in embodiments of the present invention includes a multi-carrier support environment. That is, a multi-carrier system or carrier aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between consecutive carriers and an aggregation between inconsecutive (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a primary cell (PCell) and a secondary cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or a primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An evolved universal terrestrial radio access network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to the specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a primary component carrier (PCC) may be used as the same meaning as a PCell, and a secondary component carrier (SCC) may be used as the same meaning as an SCell.

Figure 7:
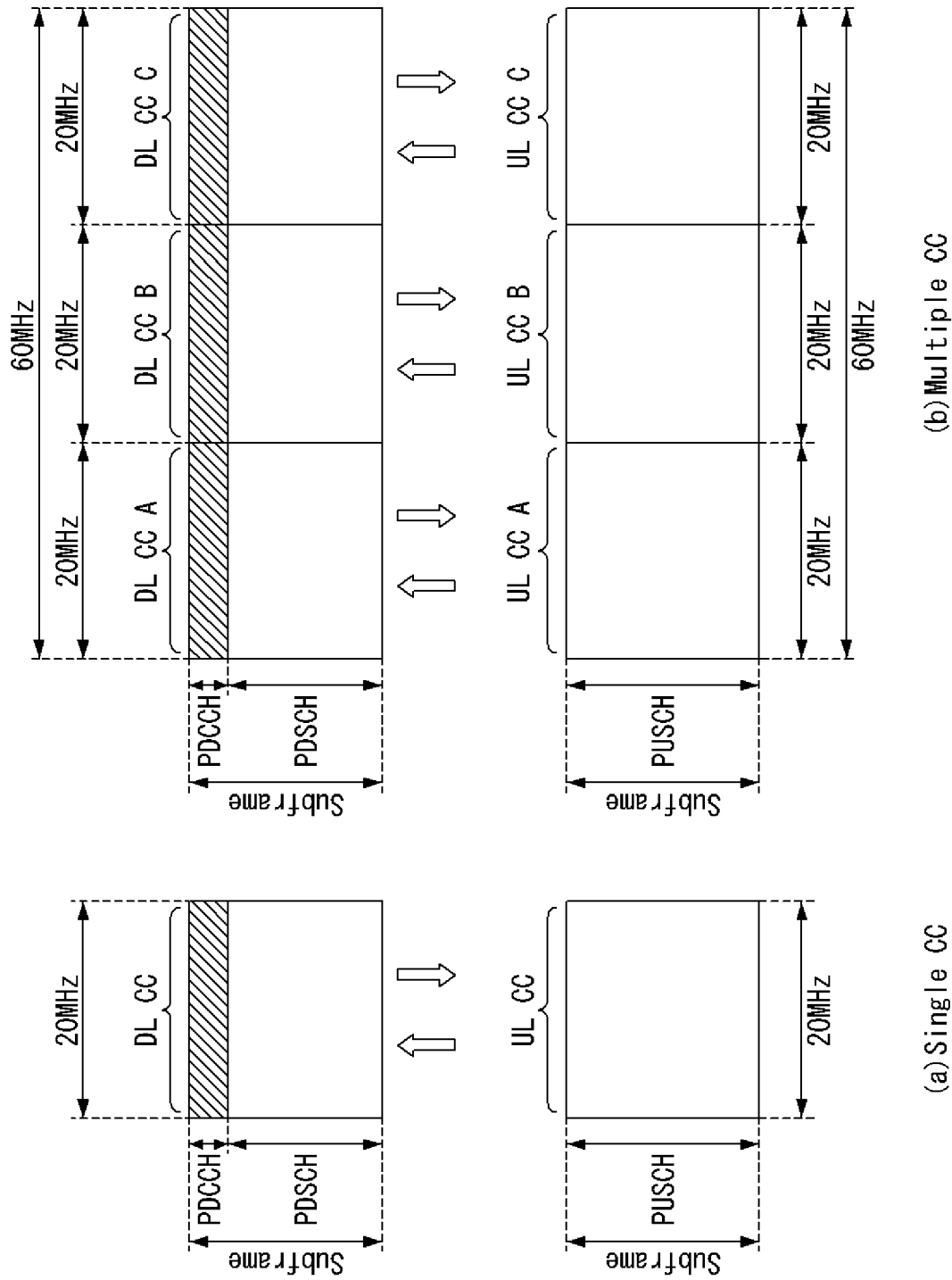
FIG. 7 shows an example of component carriers and a carrier aggregation in a wireless communication system to which an embodiment of the present invention may be applied.

FIG. 7 shows an example of component carriers and a carrier aggregation in a wireless communication system to which an embodiment of the present invention may be applied.

FIG. 7(a) shows the structure of a single carrier used in an LTE system. A CC includes a DL CC and an UL CC. One component carrier may have a frequency range of 20 MHz.

FIG. 7(b) shows the structure of a carrier aggregation used in an LTE-A system. FIG. 7(b) shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to the UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by system information block type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

When one or more SCells are configured in UE, a network may activate or deactivate the configured SCell(s). A PCell is always activated. The network activates or deactivates the SCell(s) by transmitting an activation/deactivation MAC control element.

The activation/deactivation MAC control element has a fixed size and consists of a single octet including 7 C-fields and 1 R-field. The C-field is configured for each SCell index (SCellIndex) and is indicative of the activation/deactivation of the SCell. When the value of the C-field is set to "1", it indicates the activation of an SCell having the index of the corresponding SCell. When the value of the C-field is set to "0", it indicates the deactivation of an SCell having the index of the corresponding SCell.

Furthermore, the UE maintains a timer (sCellDeactivationTimer) for each configured SCell and deactivates a related SCell when the timer expires. The same initial timer value is applied to each instance of the timer (sCellDeactivationTimer) and configured by RRC signaling. When an SCell(s) is added or after handover, an initial SCell(s) has been deactivated.

UE performs the following operation on each configured SCell(s) in each TTI.

When the UE receives an activation/deactivation MAC control element that activates an SCell in a specific TTI (subframe n), the UE activates an SCell in a TTI (a subframe n+8 or thereafter) corresponding to predetermined timing, and (re)starts a timer related to the corresponding SCell. The activation of the SCell by the UE means that the UE applies common SCell operations, such as the transmission of a sounding reference signal (SRS) on the SCell, the report of a channel quality indicator (CQI)/precoding matrix indicator (PMI)/rank indication (RI)/precoding type indicator (PTI) for the SCell, PDCCH monitoring on the SCell, and PDCCH monitoring for the SCell.

When the UE receives an activation/deactivation MAC control element that deactivates the SCell in a specific TTI (subframe n) or a timer related to the activated SCell in a specific TTI (subframe n) expires, the UE deactivates the SCell in a TTI (subframe n+8 or thereafter) corresponding to predetermined timing, stops the timer of the corresponding SCell, and flushes the entire HARQ buffer related to the corresponding SCell.

When a PDCCH on the activated SCell is indicative of an uplink grant or downlink assignment or when a PDCCH on a serving cell that schedules the activated SCell is indicative of an uplink grant or downlink assignment for the activated SCell, the UE restarts a timer related to the corresponding SCell.

When the SCell is deactivated, the UE does not transmit an SRS on an SCell, does not report a CQI/PMI/RI/PTI for an SCell, and does not transmit an UL-SCH on an SCell, and does not monitor a PDCCH on an SCell.

Cross-Carrier Scheduling

In a carrier aggregation system, there are two types of a self-scheduling method and a cross-carrier scheduling method from a viewpoint of scheduling for a carrier or serving cell. Cross-carrier scheduling may be called cross component carrier scheduling or cross cell scheduling.

Cross-carrier scheduling means that a PDCCH (DL grant) and a PDSCH are transmitted on different DL CCs or that a PUSCH transmitted according to a PDCCH (UL grant) transmitted in a DL CC is transmitted on an UL CC different from an UL CC link to a DL CC on which the UL grant has been received.

Whether cross-carrier scheduling is to be performed may be activated or deactivated in a UE-specific manner, and each piece of UE may be semi-statically notified of whether cross-carrier scheduling is to be performed through higher layer signaling (e.g., RRC signaling).

If cross-carrier scheduling is activated, there is a need for a carrier indicator field (CIF), providing notification that a PDSCH/PUSCH indicated by a corresponding PDCCH is transmitted through which DL/UL CC, in a PDCCH. For example, a PDCCH may allocate a PDSCH resource or a PUSCH resource to any one of a plurality of CCs using a CI. That is, a CIF is set if a PDCCH on a DL CC allocates a PDSCH or PUSCH resource on one of multiple DL/UL CCs which have been aggregated. In this case, the DCI format of LTE-A Release-8 may be extended according to the CIF. In this case, the set CIF may be fixed to a 3-bit field and the position of the set CIF may be fixed regardless of the size of the DCI format. Furthermore, the PDCCH structure (the same coding and the same CCE-based resource mapping) of LTE-A Release-8 may be reused.

In contrast, if a PDCCH on a DL CC allocates a PDSCH resource on the same DL CC or allocates a PUSCH resource on one linked UL CC, a CIF is not set. In this case, the same PDCCH structure (the same coding and the same CCE-based resource mapping) and DCI format as those of LTE-A Release-8 may be used.

If cross-carrier scheduling is possible, UE needs to monitor a PDCCH for a plurality of DCIs in the control region of a monitoring CC depending on the transmission mode and/or bandwidth of each CC. Accordingly, there is a need for the configuration of a search space capable of supporting such a need and for PDCCH monitoring.

In a carrier aggregation system, a UE DL CC set is indicative of a set of DL CC that has been scheduled for UE to receive a PDSCH, and a UE UL CC set is indicative of a set of UL CCs that has been scheduled for UE scheduled to send a PUSCH. Furthermore, a PDCCH monitoring set is indicative of a set of at least one DL CC on which PDCCH monitoring is performed. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set.

A DL CC included in the PDCCH monitoring set may be configured to be always self-scheduled for a linked UL CC. Such a UE DL CC set, UE UL CC set and PDCCH monitoring set may be configured in a UE-specific, UE group-specific or cell-specific manner.

If cross-carrier scheduling has been deactivated, it means that a PDCCH monitoring set is always the same as a UE DL CC set. In such a case, indication, such as separate signaling for the PDCCH monitoring set, is not required. If cross-carrier scheduling has been activated, however, a PDCCH monitoring set may be defined within a UE DL CC set. That is, in order to schedule a PDSCH or a PUSCH for UE, an eNB sends a PDCCH through only the PDCCH monitoring set.

FIG. 8 shows an example of the structure of a subframe according to cross-carrier scheduling in a wireless communication system to which an embodiment of the present invention may be applied.

Referring to FIG. 8, 3 DL CCs are aggregated in a DL subframe for LTE-A UE. A DL CC "A" indicates a case where the DL CC has been configured as a PDCCH monitoring DL CC. If a CIF is not used, each DL CC may send a PDCCH for scheduling its own PDSCH without a CIF. In contrast, if a CIF is used through higher layer signaling, only one DL CC "A" may send a PDCCH for scheduling its own PDSCH or the PDSCH of another CC using a CIF. In this case, DL CCs "B" and "C" not configured as a PDCCH monitoring DL CC do not send a PDCCH.

Hybrid—Automatic Repeat and Request (HARQ)

In a mobile communication system, one eNB sends and receives data to and from a plurality of UEs in one cell/sector through a wireless channel environment.

In a system in which multiple carriers operate or a system operating in a form similar to the system, an eNB receives packet traffic over a wired Internet and sends the received packet traffic to UE using a predetermined communication method. In this case, it is a downlink scheduling that the eNB determines to send data to which UE using which frequency domain at which timing.

Furthermore, the eNB receives data from the UE using a predetermined communication method, demodulates the received data, and sends packet traffic through the wired Internet. It is an Uplink scheduling that the eNB determines to allow which UE to send uplink data using which frequency band at which timing. In general, UE having a better channel state sends and receives data using more time and more frequency resources.

FIG. 9 is a diagram illustrating a time-frequency resource block in a time frequency domain in a wireless communication system to which an embodiment of the present invention may be applied.

Resources in a system in which multiple carriers operate and a system operating in a form similar to the system may be basically divided into a time domain and a frequency domain. The resources may be defined as resource blocks. The resource block includes specific N subcarriers and specific M subframes or a predetermined time unit. In this case, N and M may be 1.

In FIG. 9, one square means one resource block, and one resource block use several subcarriers as one axis and a predetermined time unit as the other axis. In downlink, an eNB schedules one or more resource blocks for selected UE according to a predetermined scheduling rule, and sends data to the UE using allocated resource blocks. In uplink, an eNB schedules one or more resource blocks to selected UE according to a predetermined scheduling rule, and the UE sends data using the allocated resource in uplink.

After the scheduling and the data is transmitted, an error control method if a frame is lost or damaged includes an automatic repeat request (ARQ) method and a hybrid ARQ (HARQ) method of a more advanced form.

Basically, in the ARQ method, after one frame is transmitted, a transmission side waits for an acknowledgement message (ACK). A reception side sends an acknowledgement message (ACK) only when the frame is successfully received. If an error is generated in the received frame, the reception side sends a negative-ACK (NACK) message again and deletes information about the received frame having an error from a reception end buffer. When an ACK signal is received, a transmission side sends a subsequent frame. When a NACK message is received, the transmission side resends a corresponding frame.

Unlike in the ARQ method, in the HARQ method, if a received frame cannot be demodulated, a reception end sends a NACK message to a transmission end, but stores an already received frame in a buffer during a specific time and combines the stored frame with a previously received from when the corresponding frame is retransmitted, thereby increasing a success rate of reception.

Recently, the HARQ method more efficient than the basic ARQ method is widely used. Such an HARQ method includes several types. The HARQ method may be basically divided into synchronous HARQ and asynchronous HARQ depending on retransmission timing and may be divided into a channel-adaptive method and a channel-non-adaptive method depending on whether a channel state is incorporated into the amount of resources used upon retransmission.

In the synchronous HARQ method, when initial transmission fails, subsequent retransmission is performed by a system according to predetermined timing. That is, assuming that timing upon retransmission is performed every fourth time unit after an initial transmission failure, an eNB and UE do not need to be additionally notified of such timing because the timing has already been agreed between the eNB and the UE. In this case, if a data transmission side has received an NACK message, it retransmits a frame every fourth time unit until it receives an ACK message.

In contrast, in the asynchronous HARQ method, retransmission timing may be newly scheduled or may be performed through additional signaling. Timing when retransmission for a previously failed frame is performed is changed depending on several factors, such as a channel state.

In the channel-non-adaptive HARQ method, the modulation of a frame upon retransmission, the number of resource blocks, and adaptive modulation and coding (AMC) are performed as they have been predetermined upon initial transmission. In contrast, in the channel-adaptive HARQ method, the modulation of a frame upon retransmission, the number of resource blocks, and adaptive modulation and coding (AMC) are performed are changed depending on the state of a channel. For example, in the channel-non-adaptive HARQ method, a transmission side sends data using 6 resource blocks upon initial transmission and performs retransmission using 6 resource blocks upon subsequent retransmission in the same manner. In contrast, in the channel-adaptive HARQ method, although transmission has been performed using 6 resource blocks, retransmission is subsequently performed using resource blocks greater than or smaller than the 6 resources blocks depending on a channel state.

Four HARQ combinations may be performed based on such a classification, but a HARQ method that are used primarily includes an asynchronous and channel-adaptive HARQ method and a synchronous and channel-non-adaptive HARQ method.

The asynchronous and channel-adaptive HARQ method can maximize retransmission efficiency because retransmission timing and the amount of resources used are adaptively changed depending on the state of a channel, but has a disadvantage in that overhead is increased. Accordingly, the asynchronous and channel-adaptive HARQ method is not taken into consideration in common for uplink.

The synchronous and channel-non-adaptive HARQ method is advantageous in that overhead for timing for retransmission and resource allocation is rarely present because the timing for retransmission and the resource allocation have been predetermined within a system, but is disadvantageous in that retransmission efficiency is very low if such a method is used in a channel state that varies severely.

Figure 10:
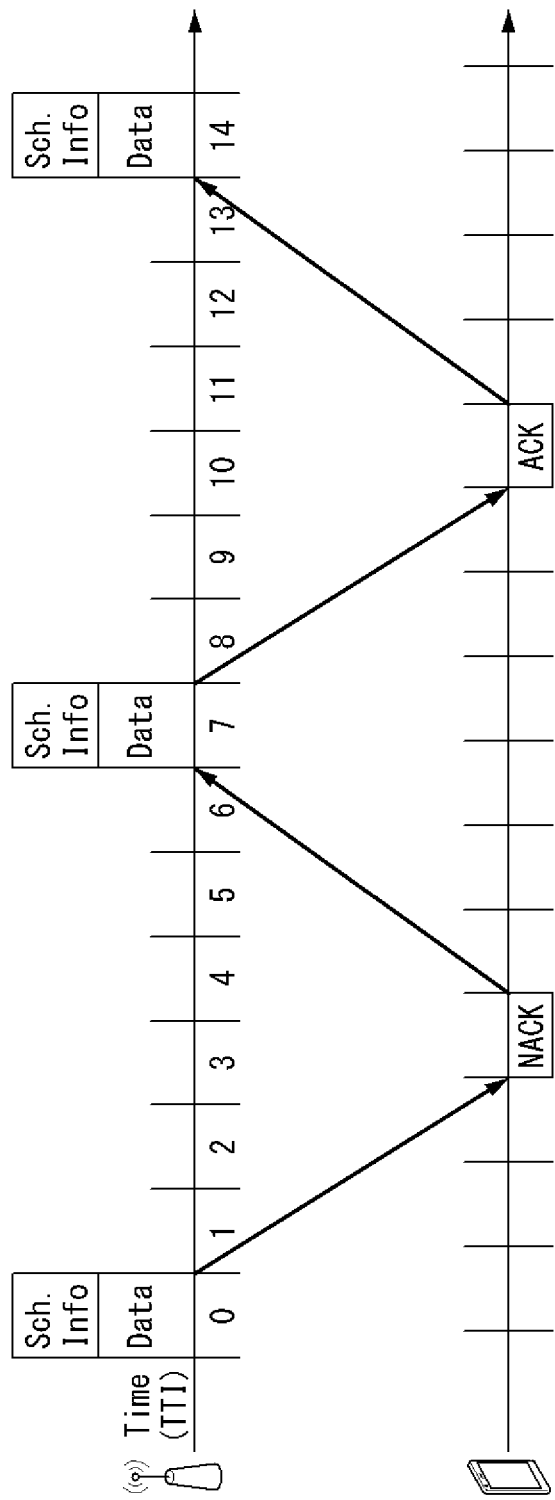
FIG. 10 is a diagram illustrating a resource allocation and retransmission process of an asynchronous HARQ method in a wireless communication system to which an embodiment of the present invention may be applied.

FIG. 10 is a diagram illustrating a resource allocation and retransmission process of the asynchronous HARQ method in a wireless communication system to which an embodiment of the present invention may be applied.

For example, in the case of downlink, after scheduling is performed and data is transmitted, ACK/NACK information is received from UE. Time delay is generated until next data is transmitted as shown in FIG. 10. The time delay is generated due to channel propagation delay and the time taken for data decoding and data encoding.

For such a delay period, a method for sending data using an independent HARQ process is used for blankless data transmission. For example, if the shortest cycle between next data transmission and subsequent data transmission is 7 subframes, data may be transmitted without a blank if 7 independent processes are placed in the 7 subframes.

An LTE physical layer supports HARQ in a PDSCH and a PUSCH and associated reception acknowledge (ACK) feedback in a separate control channel is transmitted.

In an LTE FDD system, if the LTE FDD system does not operate in MIMO, 8 stop-and-wait (SAW) HARQ processes are supported in uplink and downlink both in a constant round trip time (RTT) of 8 ms.

Figure 11:
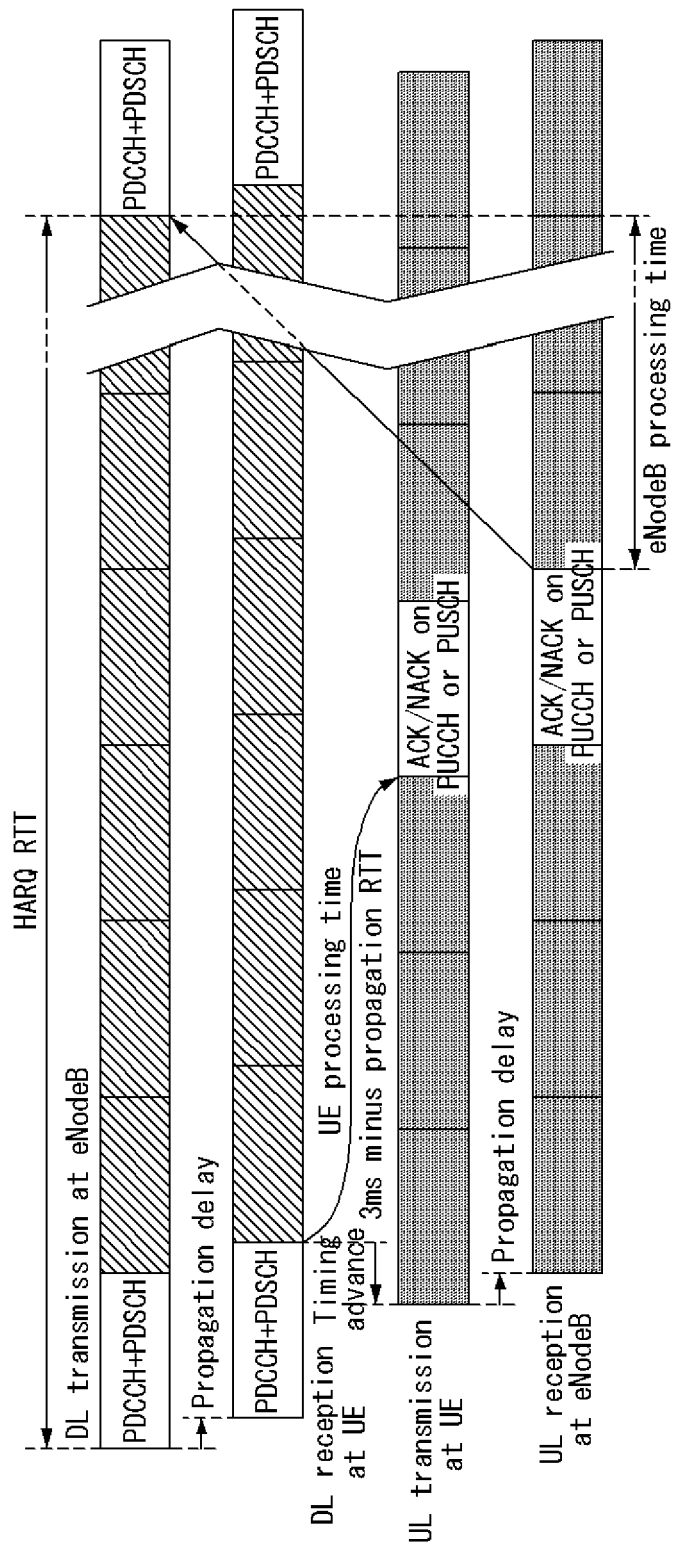
FIG. 11 is a diagram showing a downlink HARQ process in an LTE FDD system to which an embodiment of the present invention may be applied.
Figure 12:
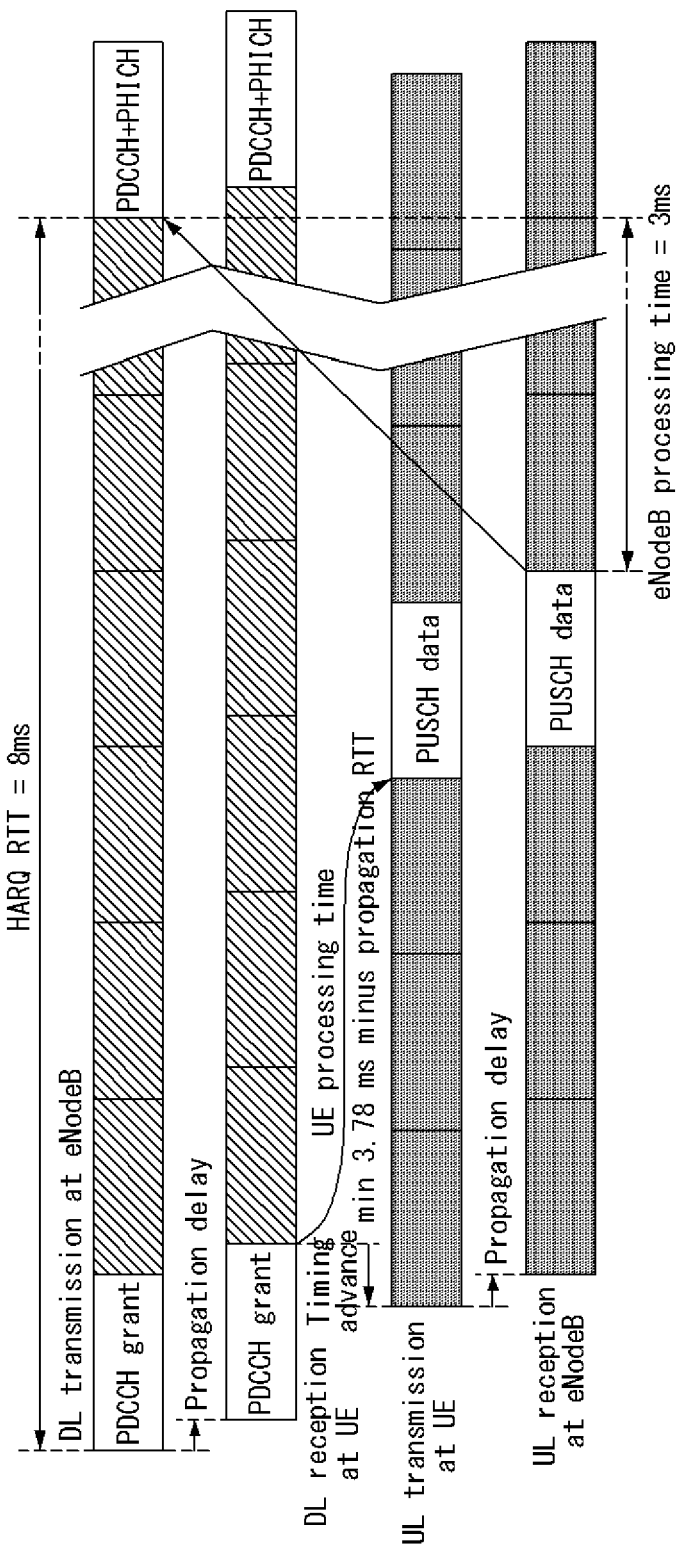
FIG. 12 is a diagram showing an uplink HARQ process in an LTE FDD system to which an embodiment of the present invention may be applied.

FIG. 11 is a diagram showing a downlink HARQ process in an LTE FDD system to which an embodiment of the present invention may be applied, and FIG. 12 is a diagram showing an uplink HARQ process in an LTE FDD system to which an embodiment of the present invention may be applied.

Each HARQ process is defined by a unique HARQ process identifier (HARQ ID) of a 3-bit size. A reception end (i.e., UE in a downlink HARQ process and an eNodeB in an uplink HARQ process) requires individual soft buffer allocation for the combination of retransmitted data.

Furthermore, for an HARQ operation, a new data indicator (NDI), a redundancy version (RV), and a modulation and coding scheme (MCS) field are defined within downlink control information. The NDI field is toggled whenever new packet transmission starts. The RV field indicates an RV selected for transmission or retransmission. The MCS field indicates an MCS level.

In an LTE system, a downlink HARQ process is an adaptive asynchronous method. Accordingly, downlink control information for an HARQ process is explicitly accompanied every downlink transmission.

In an LTE system, an uplink HARQ process is a synchronous method and may include an adaptive or non-adaptive method. The uplink non-adaptive HARQ scheme requires a preset RV sequence (e. g., 0, 2, 3, 1, 0, 2, 3, 1, . . . ) for consecutive packet transmission because it does not accompany the explicit signaling of control information. In contrast, in the uplink adaptive HARQ scheme, an RV is explicitly signaled. In order to minimize control signaling, uplink mode in which an RV (or MCS) is combined with another control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

An object of the limited buffer rate matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of UE, the code bit is transmitted in the virtual circular buffer (VCB) that may be stored in the HARQ soft buffer of the UE for all of the given TB (re)transmissions.

Coordinated Multi-Point Transmission and Reception (CoMP)

In accordance with the demand of LTE-advanced, CoMP transmission is proposed to enhance performance of a system.

CoMP is referred to as a scheme for two or more eNBs, (Access) Points or Cells cooperate with each other and communicate with UE in order to perform smoothly communication between a specific UE and an eNB, (Access) Point or Cell. The CoMP is also called co-MIMO, collaborative MIMO, network MIMO, and the like. It is anticipated that the CoMP will improve performance of UE positioned at a cell boundary and improve an average throughput of the cell (sector).

In this specification, an eNB, an access point, and a cell are used as the same meaning.

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in the cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a coordinated scheduling/beamforming (CS/CB) method.

In case of JP method, the data headed from each eNB that performs the CoMP to UE is transmitted to UE instantaneously and simultaneously, and the UE combines the signal from each of the eNBs so as to improve the reception performance. Meanwhile, in the case of the CS/CB, the data headed to UE is transmitted instantaneously through a single eNB, and the scheduling or beamforming is performed such that the interference exerted on another eNB by the UE becomes the minimum.

In the JP method, data may be used in each point (i.e, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

CA-Based CoMP Operation

In system subsequent to LTE, cooperative multi-point (CoMP) transmission may be implemented using a carrier aggregation (CA) function in LTE.

FIG. 13 is a diagram illustrating a carrier aggregation-based CoMP system in a wireless communication system to which an embodiment of the present invention may be applied.

FIG. 13 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 13 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission/reception efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable user equipment (UE) to acquire a channel information in downlink (DL), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when an eNB transmits DL data. If UE receives the corresponding reference signal, the UE can perform channel estimation, thereby demodulating data. And, the corresponding reference signal should be transmitted in a data transmitted region.

5 types of downlink reference signals are defined.

A cell-specific reference signal (CRS)

A multicast-broadcast single-frequency network reference signal (MBSFN RS)

A UE-specific reference signal or a demodulation reference signal (DM-RS)

A positioning reference signal (PRS)

A channel state information reference signal (CSI-RS)

One RS is transmitted in each downlink antenna port.

The CRS is transmitted in all of downlink subframe in a cell supporting PDSCH transmission. The CRS is transmitted in one or more of antenna ports 0-3. The CRS is transmitted only in $\Delta f=15$ kHz.

The MBSFN RS is transmitted in the MBSFN region of an MBSFN subframe only when a physical multicast channel (PMCH) is transmitted. The MBSFN RS is transmitted in an antenna port 4. The MBSFN RS is defined only in an extended CP.

The DM-RS is supported for the transmission of a PDSCH and is transmitted in antenna ports p=5, p=7, p=8 or p=7, 8, ..., u+6. In this case, u is the number of layers which is used for PDSCH transmission. The DM-RS is present and valid for the demodulation of a PDSCH only when PDSCH transmission is associated in a corresponding antenna port. The DM-RS is transmitted only in a resource block (RB) to which a corresponding PDSCH is mapped.

If any one of physical channels or physical signals other than the DM-RS is transmitted using the resource element (RE) of the same index pair (k,l) as that of a RE in which a DM-RS is transmitted regardless of an antenna port "p", the DM-RS is not transmitted in the RE of the corresponding index pair (k,l).

The PRS is transmitted only in a resource block within a downlink subframe configured for PRS transmission.

If both a common subframe and an MBSFN subframe are configured as positioning subframes within one cell, OFDM symbols within the MBSFN subframe configured for PRS transmission use the same CP as that of a subframe #0. If only an MBSFN subframe is configured as a positioning subframe within one cell, OFDM symbols configured for a PRS within the MBSFN region of the corresponding subframe use an extended CP.

The start point of an OFDM symbol configured for PRS transmission within a subframe configured for the PRS transmission is the same as the start point of a subframe in which all of OFDM symbols have the same CP length as an OFDM symbol configured for the PRS transmission.

The PRS is transmitted in an antenna port 6.

The PRS is not mapped to RE (k,l) allocated to a physical broadcast channel (PBCH), a PSS or and SSS regardless of an antenna port "p."

The PRS is defined only in $\Delta f=15$ kHz.

The CSI-RS is transmitted in 1, 2, 4 or 8 antenna ports using p=15, p=15, 16, p=15, ..., 18 and p=15, ..., 22, respectively.

The CSI-RS is defined only in $\Delta f=15$ kHz.

A reference signal is described in more detail.

The CRS is a reference signal for obtaining information about the state of a channel shared by all of UEs within a cell and measurement for handover, etc. The DM-RS is used to demodulate data for only specific UE. Information for demodulation and channel measurement may be provided using such reference signals. That is, the DM-RS is used for only data demodulation, and the CRS is used for the two purposes of channel information acquisition and data demodulation.

The receiver side (i.e., terminal) measures the channel state from the CRS and feeds back the indicators associated with the channel quality, such as the channel quality indicator (CQI), the precoding matrix index (PMI), and/or the rank indicator (RI) to the transmitting side (i.e., an eNB). The CRS is also referred to as a cell-specific RS. On the contrary, a reference signal associated with a feed-back of channel state information (CSI) may be defined as CSI-RS.

The DM-RS may be transmitted through resource elements when data demodulation on the PDSCH is required. The terminal may receive whether the DM-RS is present through the upper layer and is valid only when the corresponding PDSCH is mapped. The DM-RS may be referred to as the UE-specific RS or the demodulation RS (DMRS).

FIG. 14 illustrates a reference signal pattern mapped to a downlink resource block pair in the wireless communication system to which an embodiment of the present invention may be applied.

Referring to FIG. 14, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 14(a)) and a length of 12 OFDM symbols in the case of an extended cyclic prefix (CP) (FIG. 14(b)). Resource elements (REs) represented as '0', '1', '2', and '3' in a resource block lattice mean the positions of the CRSs of antenna port indexes '0', '1', '2', and '3', respectively and resource elements represented as 'D' means the position of the DM-RS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (eNB). The RSs are transmitted based on maximum 4 antenna ports depending on the number of transmitting antennas of an eNB in the 3GPP LTE system (for example, release-8). The transmitter side has three types of antenna arrays of three single transmitting antennas, two transmitting antennas, and four transmitting antennas. For instance, in case that the number of the transmitting antennas of the eNB is 2, CRSs for antenna #1 and antenna #2 are transmitted. For another instance, in case that the number of the transmitting antennas of the eNB is 4, CRSs for antennas #1 to #4 are transmitted.

When the eNB uses the single transmitting antenna, a reference signal for a single antenna port is arrayed.

When the eNB uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the eNB uses four transmitting antennas, reference signals for four transmitting antenna ports are arrayed using the TDM and/or FDM scheme. Channel information measured by a downlink signal receiving side (i.e., a terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule for mapping a CRS to a resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. N_symb^DL represents the number of OFDM symbols in one downlink slot and N RBADL represents the number of radio resources allocated to the downlink. n_s represents a slot index and, N_ID^Cell represents a cell ID. mod represents an modulo operation. The position of the reference signal varies depending on the v_shift value in the frequency domain. Since v_shift depends on the cell ID (i.e., physical layer cell ID), the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DM-RS is described in more detail, the DM-RS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DM-RS for rank 1 beamforming is defined. The DM-RS for the rank 1 beamforming also means a reference signal for antenna port index 5.

A rule of mapping the DM-RS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and 1 indicate a subcarrier index and a symbol index, respectively, and p indicates an antenna port. N_sc^RB indicates the size of the resource block in the frequency domain and is expressed as the number of subcarriers. n_PRB indicates the number of physical resource blocks. N_RB^PDSCH indicates a frequency band of the resource block for the PDSCH transmission. n_s indicates the slot index and N_ID^cell indicates the cell ID. mod indicates the modulo operation. The position of the reference signal varies depending on the v_shift value in the frequency domain. Since v_shift depends on the cell ID (i.e., physical layer cell ID), the position of the reference signal has various frequency shift values according to the cell.

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

If not, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 3 illustrates a PDCCH and PDSCH configured by an SI-RNTI.

TABLE 3

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 4 illustrates a PDCCH and PDSCH configured by a P-RNTI.

TABLE 4

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 5 illustrates a PDCCH and PDSCH configured by an RA-RNTI.

TABLE 5

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,

UE does not receive a PDSCH RB transmitted in the antenna port 5 even in any subframe in which the number of OFDM symbols for a PDCCH having a common CP is 4.

If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.

UE does not receive a PDSCH RB transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

In the case of the frame structure type 2,

UE does not receive a PDSCH RB transmitted in the antenna port 5 even in any subframe in which the number of OFDM symbols for a PDCCH having a common CP is 4.

If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.

If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.

If a common CP is configured, UE does not receive a PDSCH in the antenna port 5 in which distributed VRB resource allocation has been assigned within a special subframe in an uplink-downlink configuration #1 or #6.

UE does not receive a PDSCH transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 6 illustrates a PDCCH and PDSCH configured by a C-RNTI.

TABLE 6

| TRANS-MISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | large delay CDD or transmit diversity |
| Mode 4 | DCI format 1A | common and UE-specific by a C-RNTI | transmit diversity |
| | DCI format 2 | UE-specific by a C-RNTI | closed-loop spatial multiplexing or transmit diversity |
| Mode 5 | DCI format 1A | common and UE-specific by a C-RNTI | transmit diversity |
| | DCI format 1D | UE-specific by a C-RNTI | multi-user MIMO |
| Mode 6 | DCI format 1A | common and UE-specific by a C-RNTI | transmit diversity |
| | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, transmit diversity |
| | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
| | DCI format 2B | UE-specific by a C-RNTI | dual layer transmission, ports 7 and 8 or a single antenna port, a port 7 or 8 |

TABLE 6-continued

| TRANS- MISSION MODE | DCI FORMAT | SEARCH SPACE | METHOD FOR SENDING PDSCH CORRESPONDING TO PDCCH |
|---|---|---|---|
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
| | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 7 illustrates a PDCCH and PDSCH configured by an SPS C-RNTI.

TABLE 7

| TRANS- MISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | transmit diversity |
| Mode 4 | DCI format 1A | common and UE-specific by a C-RNTI | transmit diversity |
| | DCI format 2 | UE-specific by a C-RNTI | transmit diversity |

TABLE 7-continued

| TRANS- MISSION MODE | DCI FORMAT | SEARCH SPACE | METHOD FOR SENDING PDSCH CORRESPONDING TO PDCCH |
|---|---|---|---|
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
| | DCI format 1 | UE-specific by a C-RNTI | a single antenna port, a port 5 |
| Mode 8 | DCI format 1A | common and UE-specific by a C-RNTI | a single antenna port, a port 7 |
| | DCI format 2B | UE-specific by a C-RNTI | a single antenna port, a port 7 or 8 |
| Mode 9 | DCI format 1A | common and UE-specific by a C-RNTI | a single antenna port, a port 7 |
| | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 8. The PDSCH corresponding to the PDCCH(s) is scrambling-initialized by the temporary C-RNTI.

Table 8 illustrates a PDCCH and a PDSCH configured by a temporary C-RNTI.

TABLE 8

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNTI | If the number of PBCH antenna ports is 1, a single antenna port, a port 0 is used, and if not, transmit diversity |

UE Procedure for PUSCH Transmission

UE is semi-statically configured through higher layer signaling so that it performs PUSCH transmission signaled through a PDCCH according to any one of two types of uplink transmission modes 1 and 2 defined in Table 9 below. If the UE is configured by a higher layer so that it decodes a PDCCH with CRC scrambled by a C-RNTI, the UE decodes the PDCCH according to a combination defined in Table 9 and sends the corresponding PUSCH. The PUSCH transmission corresponding to the PDCCH(s) and the PUSCH retransmission for the same transport block is scrambling-initialized by the C-RNTI. The transmission mode 1 is a default uplink transmission mode until an uplink transmission mode is assigned in the UE by higher layer signaling.

When UE is configured as the transmission mode 2 and receives a DCI format 0 uplink scheduling grant, the UE assumes that PUSCH transmission is related to a transport block 1 and a transport block 2 is disabled.

Table 9 illustrates a PDCCH and a PUSCH configured by a C-RNTI.

TABLE 9

| TRANS- MISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |
|  | DCI format 4 | UE-specific by a C-RNTI | closed-loop spatial multiplexing |

If UE is configured by a higher layer so that it decodes a PDCCH with CRC scrambled by a C-RNTI and also configured to receive a random access procedure started by a PDCCH order, the UE decodes the PDCCH according to a combination defined in Table 10 below.

Table 10 illustrates a PDCCH set as a PDCCH order for starting a random access procedure.

TABLE 10

| DCI FORMAT | SEARCH SPACE |
|---|---|
| DCI format 1A | common and UE-specific by a C-RNTI |

If UE is configured by a higher layer so that it decodes a PDCCH with CRC scrambled by an SPS C-RNTI, the UE decodes the PDCCH according to a combination defined in Table 11 below and sends a corresponding PUSCH. The PUSCH transmission corresponding to the PDCCH(s) and the PUSCH retransmission for the same transport block is scrambling-initialized by the SPS C-RNTI. PUSCH retransmission for the same transport block as the minimum transmission of a PUSCH without a corresponding PDCCH is scrambling-initialized by an SPS C-RNTI.

Table 11 illustrates a PDCCH and a PUSCH configured by an SPS C-RNTI.

TABLE 11

| TRANS- MISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |

If UE is configured by a higher layer so that it decodes a PDCCH scrambled by a temporary C-RNTI regardless of whether the UE has been configured to decode a PDCCH with CRC scrambled by a C-RNTI, the UE decodes the PDCCH according to a combination defined in Table 12 and sends a corresponding PUSCH. The PUSCH corresponding to the PDCCH(s) is scrambling-initialized by the temporary C-RNTI.

If a temporary C-RNTI is set by a higher layer, PUSCH transmission corresponding to a random access response grant and PUSCH retransmission for the same transport block are scrambled by the temporary C-RNTI. If not, the PUSCH transmission corresponding to the random access response grant and the PUSCH retransmission for the same transport block are scrambled by a C-RNTI.

Table 12 illustrates a PDCCH configured by a temporary C-RNTI.

TABLE 12

| DCI FORMAT | SEARCH SPACE |
|---|---|
| DCI format 0 | common |

If UE is configured by a higher layer so that it decodes a PDCCH with CRC scrambled by a TPC-PUCCH-RNTI, the UE decodes the PDCCH according to a combination defined in Table 13 below. In Table 13, indication "3/3A" means that UE receives the DCI format 3 or a DCI format depending on a configuration.

Table 13 illustrates a PDCCH configured by a TPC-PUCCH-RNTI.

TABLE 13

| DCI FORMAT | SEARCH SPACE |
|---|---|
| DCI formats 3/3A | common |

If UE is configured by a higher layer so that it decodes a PDCCH with CRC scrambled by a TPC-PUSCH-RNTI, the UE decodes the PDCCH according to a combination defined in Table 14 below. In Table 14, indication "3/3A" includes that UE receives the DCI format 3 or a DCI format depending on a configuration.

Table 14 illustrates a PDCCH configured by a TPC-PUSCH-RNTI.

TABLE 14

| DCI FORMAT | SEARCH SPACE |
|---|---|
| DCI formats 3/3A | common |

Cross-Carrier Scheduling and E-PDCCH Scheduling

In the 3GPP LTE Rel-10 system, a cross-CC scheduling operation is defined as follows in a situation in which a plurality of component carriers (CCs)=(serving)cells) has been aggregated. One CC (i.e., scheduled CC) may be previously configured so that DL/UL scheduling is performed by only a specific one CC (i.e., scheduling CC) (i.e., so that a DL/UL grant PDCCH for a corresponding scheduled CC is received). Furthermore, the corresponding scheduling CC may basically perform DL/UL scheduling therefor. In other words, a search space (SS) for a PDCCH that schedules a scheduling/scheduled CC within a cross-CC scheduling relation may be fully present in the control channel region of the scheduling CC.

In the LTE system, an FDD DL carrier or TDD DL subframes, as described above, use the first n OFDM symbols of a subframe to send a PDCCH, a PHICH, and a PCFICH, that is, physical channels for sending various types of control information, and use the remaining OFDM symbols for PDSCH transmission. In this case, the number of symbols used for control channel transmission in each subframe is transferred to UE dynamically through a physical channel, such as a PCFICH or in a semi-static manner through RRC signaling. In this case, characteristically, an "n" value may be set to 1 symbol to a maximum of 4 symbols depending on subframe characteristics and system characteristics (e.g., FDD/TDD or a system bandwidth).

In an existing LTE system, a PDCCH, that is, a physical channel for DL/UL scheduling and the transmission of various types of control information, has a limit because it is transmitted through restricted OFDM symbols.

Accordingly, an enhanced PDCCH (i.e., an E-PDCCH) that is more freely multiplexed into a PDSCH using an FDM/TDM method may be introduced instead of a control channel transmitted through an OFDM symbol separated from a PDSCH like a PDCCH.

Figure 15:
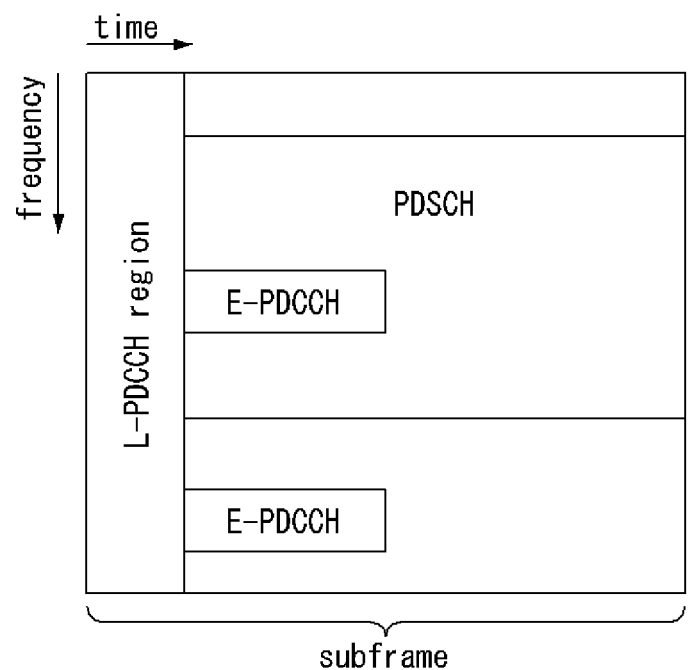
FIG. 15 is a diagram illustrating a PDCCH and E-PDCCHs in a wireless communication system to which an embodiment of the present invention may be applied.

FIG. 15 is a diagram illustrating a PDCCH and E-PDCCHs in a wireless communication system to which an embodiment of the present invention may be applied.

Referring to FIG. 15, a legacy PDCCH (i.e., L-PDCCH) is transmitted in the first n OFDM symbols of a subframe, and E-PDCCHs are multiplexed into a PDSCH using an FDM/TDM method and transmitted.

Quasi Co-Located (QCL) Between Antenna Ports

Quasi Co-Located and Quasi Co-Location (QC/QCL) May be Defined as Follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE can perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE can perform the detection/reception, channel estimation, and channel state report of a downlink reference signal through a QC/QCL assumption between antenna ports.

Method for Sending and Receiving Data in Unlicensed Band

An embodiment of the present invention proposes a technology regarding a method for enabling UE to directly determine a transmission opportunity (TXOP) period or a reserved resource period (RRP) by detecting a specific signal (e.g., a preamble, a synchronous signal, a CRS, a CSI-RS, etc) through a process, such as blind detection, in a situation in which a signal is transmitted and received through a carrier of an unlicensed band.

Hereinafter, in this specification, a time period in which an eNB and UE have occupied/secured a corresponding carrier resource in order to send a signal through a carrier of an unlicensed band/spectrum is collectively called an RRP.

In this case, the RRP may be defined to be essentially limited to a single consecutive time period or may be defined as a set form of a plurality of consecutive time periods. For example, the RRP may include an unit of a symbol, a slot, a subframe, a radio frame, etc.

The name of a base station described in this specification is used as a comprehensive term, including a remote radio head (RRH), an eNB, a transmission point (TP), a reception point (RP), and a relay.

Hereinafter, a proposal method based on 3GPP LTE/LTE-A systems is described below, for convenience of description. However, the range of a system to which the proposal method is applied may be extended to other systems (e.g., UTRA) in addition to the 3GPP LTE/LTE-A systems.

In 3GPP, there has been proposed a service of an unlicensed band/spectrum, that is, license assisted access (LAA), as one of schemes for satisfying the explosive increase of mobile communication data traffic as mobile communication data traffic is explosively increased. LAA means a technology for aggregating an LTE license band and an unlicensed band/spectrum into one using a carrier aggregation (CA). LAA is described below with reference to FIG. 16.

Figure 16:
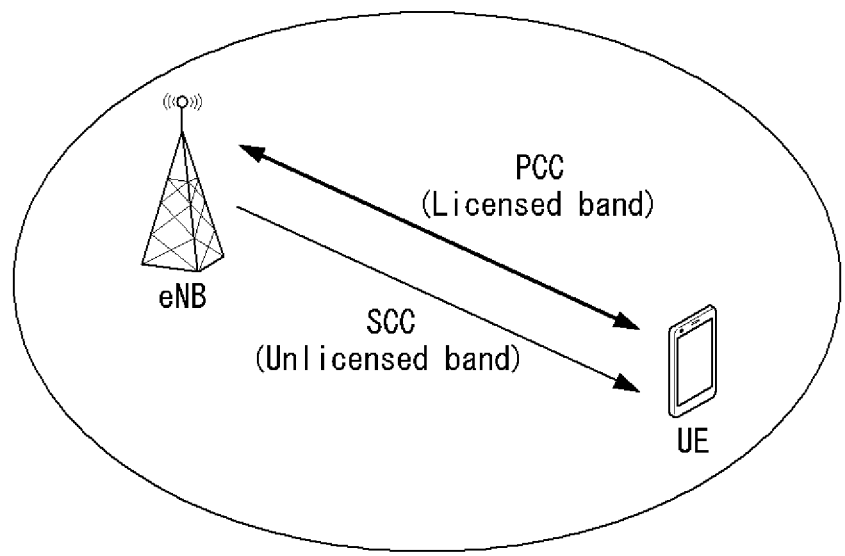
FIG. 16 is a diagram illustrating a carrier aggregation in an unlicensed band/spectrum according to an embodiment of the present invention.

FIG. 16 is a diagram illustrating a carrier aggregation in an unlicensed band/spectrum according to an embodiment of the present invention.

An eNB may send a signal to UE or the UE may send a signal to an eNB in a situation in which a component carrier (CC) (or cell) of a licensed band and a CC (or cell) of an unlicensed band have been subjected to a carrier aggregation as in FIG. 16.

Hereinafter, for convenience of description, a licensed band is referred to as an "LTE-A band", and an unlicensed band/spectrum is referred to as an "LTE-U band" compared to an LTA-A band.

Hereinafter, in the description of an embodiment of the present invention, for convenience of description of a method proposed in an embodiment of the present invention, there is assumed a situation in which UE has been configured to perform wireless communication through two CCs in a licensed band and an unlicensed band/spectrum. In this case, for example, a carrier of a licensed band may be construed as being a primary component carrier (PCC or PCell), and a carrier of an unlicensed band/spectrum may be construed as being a secondary component carrier (SCC or SCell).

However, methods proposed in embodiments of the present invention may be extended and applied to a situation in which a plurality of licensed bands and a plurality of unlicensed bands are used as a carrier aggregation scheme. Furthermore, the methods may also be extended and applied to a case where only unlicensed bands/spectrums are subjected to a carrier aggregation or only licensed bands are subjected to a carrier aggregation and the transmission and reception of a signal are performed between an eNB and UE. Furthermore, the methods proposed in the embodiments of the present invention may also be extended and applied to systems having other characteristics in addition to 3GPP LTE systems.

An LTE-U band means a band in which the exclusive use of a specific system is not guaranteed. Accordingly, in order for an eNB and UE to perform communication in an LTE-U band, the corresponding band needs to be occupied/secured during a specific time period (i.e., an RRP) through a contention with other communication systems (e.g., Wi-Fi (i.e., an 802.11 system)) not related to LTE because the corresponding band is an unlicensed spectrum.

In order to occupy such an RRP, several methods may be present. As a representative method, there may be a method in which an eNB and/or UE sends a specific reservation signal or continues to send an RS and a data signal so that a signal of a specific power level or more continues to be transmitted during an RRP in order for other communication systems, such as a Wi-Fi system, to recognize that a corresponding wireless channel has been busy.

In this case, the eNB may solely perform clear channel assessment (CCA) in an LTE-U band and notify the UE of a occupied RRP. For example, if an operation of an uplink/downlink band for an FDD system is supported in an LTE-U band, only an eNB may perform CCA in an LTE-U band and occupy an RRP.

In contrast, UE as well as eNB may autonomously occupy resources of an LTE-U band by performing CCA. For example, if a TDD operation is supported in an LTE-U band or an operation of an uplink band for an FDD system is supported in an LTE-U band, UE as well as eNB may occupy an RRP in the LTE-U band by performing CCA.

If the eNB has previously determined an RRP time period to be occupied in the LTE-U band, it may notify the UE of the RRP time period in advance so that the UE can maintain a communication transmission/reception link during the corresponding indicated RRP.

A method for notifying, by an eNB, UE of corresponding RRP time period information may include a method for explicitly transmitting corresponding RRP time period information through another CC (e.g., an LTE-A band) connected in a carrier aggregation scheme.

For example, an eNB may send information about a point of time at which an RRP is started and a point of time at which the RRP is ended (e.g., a slot number or a subframe index) to UE, and may send information about a point of time at which an RRP is started (e.g., a slot number or a subframe index) and the length of the RRP (e.g., the number of slots or subframes) to UE.

However, as described above, a method for transmitting RRP information in an explicit indication scheme has limits in that the amount of predictable data traffic must be calculated in advance and the state of a wireless communication channel link in an LTE-U band can be expected to some extent. That is, if an interference environment is severely changed during an RRP and in the case of an environment in which the severe change of an interference environment cannot be easily expected, there are problems in that additional signaling may continue to be generated, such as that an RRP has to be further extended out of its initial expectation, and a normal communication link when an error is generated in a signaling exchange is not guaranteed.

Accordingly, an embodiment of the present invention proposes a method for enabling UE to detect a reference signal of a corresponding unlicensed band/spectrum and to attempt to the detection in a blind detection scheme and to recognize a detected period as an RRP other than such an explicit RRP indication method.

Figure 17:
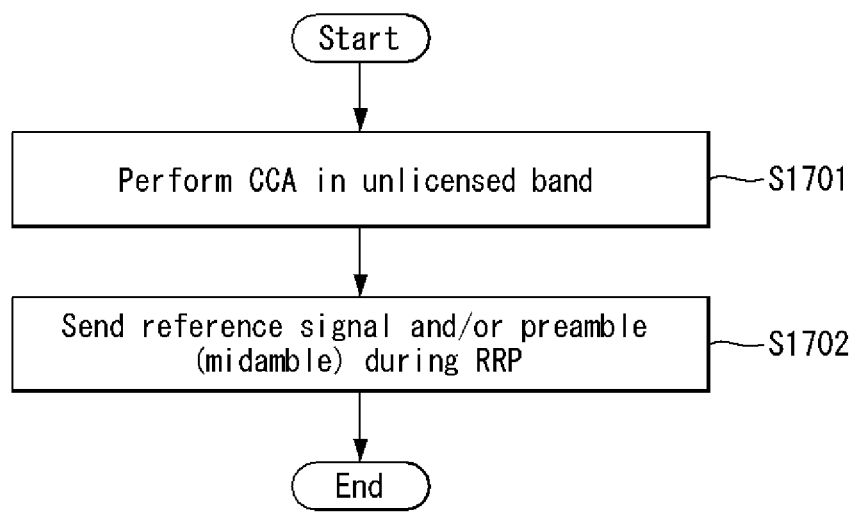
FIGS. 17 to 19 are diagrams illustrating a method for sending and receiving data in an unlicensed band/spectrum according to an embodiment of the present invention.

FIG. 17 is a diagram illustrating a method for sending and receiving data in an unlicensed band/spectrum according to an embodiment of the present invention.

Referring to FIG. 17, an eNB (and/or UE) performs CCA in an unlicensed band/spectrum (i.e., an LTE-U band) at step S1701.

For example, prior to the start of transmission, the eNB (and/or the UE) may perform CCA for sensing the wireless channel or medium of an LTE-U band during a specific time period (e.g., a DCF inter-frame space (DIFS) period according to IEEE 802.11).

The eNB (and/or the UE) sends (or broadcast) a reference signal and/or a preamble (or midamble) during its busy period (i.e., an RRP) at step S1702.

That is, if the eNB (and/or the UE) performs CCA and determines that a medium has not been occupied in the LTE-U band, the eNB (and/or the UE) sends the RS (e.g., a CRS, a CSI-RS, a DM-RS, an SRS, etc) and/or the preamble/midamble during the RRP.

In other words, in order to send downlink data (i.e., a downlink band in the case of FDD and a downlink subframe in the case of TDD) or to receive uplink data (i.e., an uplink band in the case of FDD and an uplink subframe in the case of TDD), the eNB continues to send the RS and/or the preamble/midamble when the eNB needs to occupy the medium. Likewise, the UE continues to send the RS and/or the preamble/midamble when the UE needs to occupy the medium in order to send uplink data (i.e., an uplink band in the case of FDD and an uplink subframe in the case of TDD).

In this case, the RRP may be determined to be a variable length depending on the amount of data to be transmitted or received, but may be previously set as a fixed length.

If a plurality of CCs (or cells) has been configured in the UE in the unlicensed band/spectrum, the RRP may be independently determined for each CC (or cell). Accordingly, the eNB (and/or the UE) may determine the RRP independently for each CC (or cell) by performing CCA, and may send the RS and/or the preamble/midamble for each CC (or cell).

If the reference signal and/or the preamble/midamble is transmitted during the RRP as described above, devices of other wireless communication systems in addition to the eNB and/or the UE can also determine that the medium has been occupied by the eNB and/or the UE during the RRP.

If the medium is detected to be the occupied state in the LTE-U band at step S1701, the eNB (and/or the UE) does not start its own transmission. In this case, the eNB (and/or the UE) may wait for a delay time (e.g., a random backoff period) for medium access and then attempt to send a signal again (i.e., perform CCA).

Figure 18:
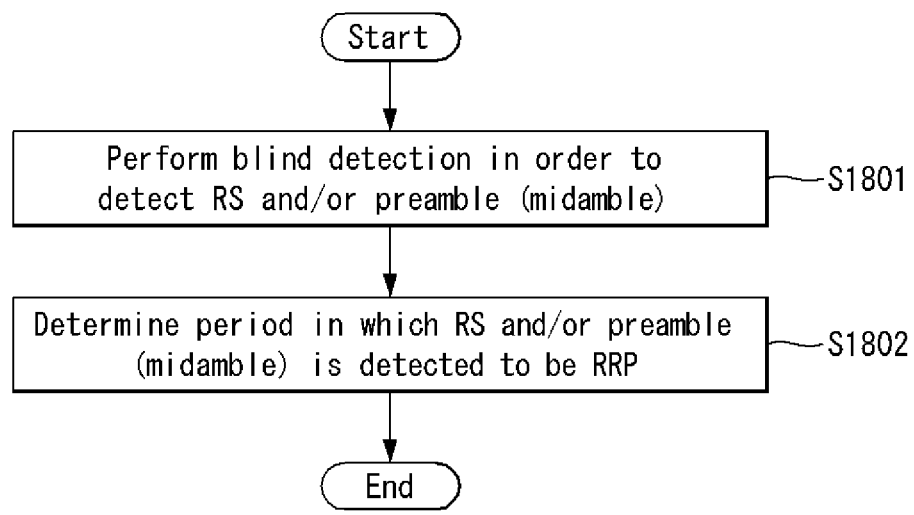

FIG. 18 is a diagram illustrating a method for sending and receiving data in an unlicensed band/spectrum according to an embodiment of the present invention.

FIG. 18 illustrates an operation of a counterpart device for detecting a reference signal and/or a preamble/midamble within an RRP, which is transmitted by an apparatus performing CCA as in FIG. 17.

Referring to FIG. 18, UE (and/or an eNB) performs blind detection in order to detect a predetermined specific signal at step S1801.

In this case, the predetermined specific signal may be an RS and/or a preamble (or midamble), for example.

For example, the UE may continue to perform blind detection on the reference signal and/or the preamble/midamble in order to determine an RRP from a point of time at which a carrier aggregation is configured with respect to a CC belonging to an LTE-U band through an RRC connection reconfiguration message, etc. from the eNB.

The UE (and/or the eNB) determines a period in which a predetermined specific signal is detected through blind detection to be an RRP at step S1802.

In this case, the UE (and/or the eNB) may detect an RS and/or a preamble (midamble) through blind detection, may determine the start point of the RRP, and may not perform blind detection during a specific time.

As described above, in order for the UE to autonomously determine an RRP in an LTE-U band, there is a need for information for the blind detection of a reference signal (RS) and/or preamble/midamble and a RRP determination (hereinafter, "RRP configuration information").

Figure 19:
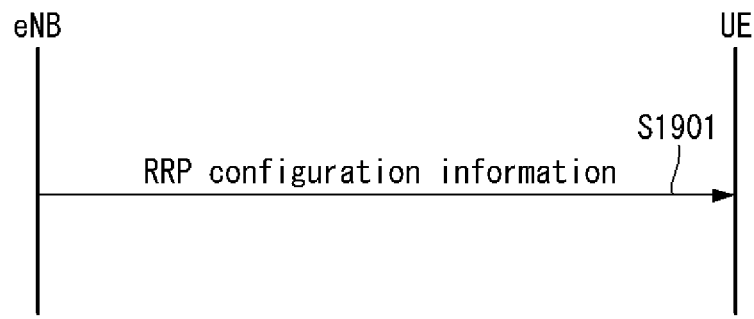

FIG. 19 is a diagram illustrating a method for sending and receiving data in an unlicensed band/spectrum according to an embodiment of the present invention.

Referring to FIG. 19, in order for UE to autonomously determine an RRP in an LTE-U band, an eNB may previously send various parameters (i.e., RRP configuration information) necessary for the blind detection of a reference signal (RS) and/or preamble/midamble and an RRP determination to the UE at step S1901.

In this case, the eNB may send the RRP configuration information to the UE through higher layer signaling (e.g., RRC signaling or an MAC control element).

Furthermore, such RRP configuration information may be transferred to the UE through a serving cell (e.g., a PCell or SCell) of an LTE-A band.

In order to determine the RRP, the UE may use an RS (e.g., a CRS, a CSI-RS, etc) and/or a preamble/midamble.

If the RRP is capable of being determined using only the RS, only RS-related information may be defined as the RRP configuration information and may be provided to the UE.

In contrast, if the RRP is capable of being determined based on only the preamble/midamble, only preamble/midamble-related information may be defined as the RRP configuration information and provided to the UE. Furthermore, in this case, the RRP is determined through the preamble/midamble, but the RS-related information is also included in the RRP configuration information for the blind detection of the RS by the UE in a subsequent subframe and may be provided to the UE.

Alternatively, if the RRP is capable of being determined using the two signals of the RS and the preamble/midamble, both the RS-related information and the preamble/midamble-related information may be defined as the RRP configuration information and provided to the UE.

Furthermore, the RRP configuration information may be fixed and previously known to both the UE and the eNB. In this case, the eNB may not provide the RRP configuration information to the UE. That is, step S1901 may not be performed.

Hereinafter, RRP configuration information is described in more detail below.

An eNB may provide at least one of the following parameters as the RRP configuration information.

RS-Related Information to be Subjected to Blind Detection in an LTE-U Band

For a purpose such as CoMP, pieces of information below may be configured into one set, and RS-related information may be provided as two or more sets.

Hereinafter, an example in which an RS is a CRS for a purpose for specifying a "cell" is chiefly described, for convenience of description. In this case, the present invention is not limited to the example, and another RS, such as a CSI-RS, may be used to determine an RRP in order to specify a "TP." In this case, some similar information may be provided according to a corresponding RS as information about another RS, such as a CSI-RS.

1) An RS Sequence Scrambling Initialization Parameter (or a CRSsequence Scrambling Initialization Parameter)

For example, if a CRS is used for an RRP determination, a physical cell ID (e.g., 0 to 503) may correspond to such use.

Alternatively, if a CSI-RS is used for an RRP determination, a TP-specific scrambling ID may correspond to such use.

2) An RS Port Number/the Number of RS Ports

For example, if a CRS is used for an RRP determination, a CRS antenna port number may be directly indicated (e.g., an antenna port 0, 1) or a CRS antenna port number may indirectly be indicated as information about the number of CRS antenna ports (e.g., the number of antenna ports 2 indicates an antenna port 0, 1).

Alternatively, if a CSI-RS is used for an RRP determination, a CSI-RS antenna port number may be directly indicated (e.g., an antenna port 15, 16) or a CRS antenna port number may be indirectly indicated as information about the number of CRS antenna ports (e.g., the number of antenna ports 2 indicates an antenna port 15, 16).

3) Information for Identifying the Boundary of a Radio Frame

For example, a slot number offset or a subframe offset value in comparison with a reference cell timing may be provided.

In this case, the reference cell may be previously fixed as a specific cell or may be designated by an eNB.

For example, a reference cell may be defined as a serving cell corresponding to a CC on which higher layer signaling including such RRP configuration information is carried. Furthermore, the reference cell may be defined as a serving cell corresponding to the PCell of corresponding UE. Furthermore, explicit indication (e.g., a cell ID or index ("ServCellIndex")), indicating that a serving cell corresponding to a specific CC is designated as a reference cell, may be provided.

In this case, if a floating radio frame boundary to be described later is applied, the boundary of the radio frame is started (i.e., a subframe index and slot number increase from #0) from a point of time at which CRC is detected or after a specific offset from the point of time at which CRC is detected. Accordingly, information providing notification of the boundary of a radio frame may be omitted.

Furthermore, if a reference cell and the boundary of a radio frame have been aligned, information providing notification of the boundary of the radio frame may be omitted.

4) MBSFN Subframe Configuration

In an MBSFN subframe, a CRS is transmitted only within the non-MBSFN region of the MBSFN subframe. The MBSFN subframe is divided into a non-MBSFN region and an MBSFN region. The non-MBSFN region is defined as the first n (e.g., 1 or 2) OFDM symbols of the MBSFN subframe. The MBSFN region within the MBSFN subframe is defined as an OFDM symbol other than the non-MBSFN region.

MBSFN subframe configuration information is formed in a bitmap form, for example, and a subframe may be indicated in each bit of the bitmap. For example, "1" may indicate an MBSFN subframe and "0" may indicate a non-MBSFN subframe and the vice versa.

Accordingly, if the MBSFN subframe configuration information is provided, a CRS transmission symbol is restricted to only a PDCCH region (e.g., the first 1 or 2 OFDMA symbols within a subframe) in corresponding indicated MBSFN subframes indicated.

5) Information about Transmission Bandwidth of RS

Information about the transmission bandwidth of an RS may be indicated by the number of RBs.

In this case, it may be assumed that the transmission band of an RS is the same as a system bandwidth. In this case, information about the transmission bandwidth of an RS may not be included in RRP configuration information.

6) Information about Power Level Threshold for RRP Determination

This information may means information about a specific power level threshold value at which a corresponding subframe should be determined to belong to an RRP for each subframe.

For example, if a power level threshold is set in a subframe unit, when an average received power value of RS REs in a corresponding subframe is greater than or equal to a corresponding threshold value, UE may determine that the subframe belongs to an RRP.

a) Such a power level threshold may be defined as a value for a subframe unit and/or OFDM symbol unit (or another specific time unit) or may be set by an eNB.

In this case, an RRP may be subdivided in an OFDM symbol unit (or another specific time unit) and defined.

For example, if a CRS is used for an RRP determination, UE determines whether an average received power value of CRS REs for a corresponding OFDM symbol is greater than or equal to a threshold based on the threshold of each OFDM symbol. Furthermore, the UE may determine OFDM symbols from an OFDM symbol whose average received power value is greater than or equal to a threshold to the last OFDM symbol whose average received power value is greater than or equal to the threshold to be an RRP. Furthermore, the UE may determine OFDM symbols from an OFDM symbol whose average received power value is greater than or equal to a threshold to an OFDM symbol whose average received power value is less than the threshold to be an RRP.

Alternatively, the UE determines whether an average received power value is greater than or equal to a threshold for each OFDM symbol (or in another specific time unit), but may determine an RRP for each subframe.

This is described in more detail. UE may determine whether an average received power value of RS REs for a corresponding OFDM symbol is greater than or equal to a threshold based on the threshold of each OFDM symbol unit (or another specific time unit). If all of OFDM symbols (e.g., OFDM symbols in which an RS is transmitted) to be determined belonging to the corresponding subframe are determined to be successfully detected, the corresponding subframe may be defined or configured so that it is included in an RRP.

For example, if a CRS for an antenna port 0 is used for an RRP determination (in the case of a common CP), UE determines whether an average received power value of 2 CRS REs in the first OFDM symbol (l=0) of a first slot is greater than or equal to a threshold, and determines that the detection of the CRS is successful if the average received power value is greater than or equal to the threshold. Furthermore, the UE determines whether the average received power value of the 2 CRS REs in the fifth OFDM symbol (l=4) of the first slot is greater than or equal to the threshold, and determines that the detection of the CRS is successful if the average received power value is greater than or equal to the threshold. Likewise, the UE determines whether the detection of the CRS is successful with respect to a second slot in the same manner. As described above, the UE determines whether the detection of a CRS is successful in each OFDM symbol in which the CRS is transmitted, and includes a corresponding subframe in an RRP if the CRS is successfully detected in all of OFDM symbols of one subframe in which the CRS is transmitted.

Alternatively, the UE may determine whether an average received power value of RS Res for corresponding OFDM symbol is greater than or equal to a threshold based on the threshold of each OFDM symbol (or another specific time unit). If the detection of a CRS is successful in at least L symbols of all of OFDM symbols to be determined belonging to a corresponding subframe, the corresponding subframe may be defined or configured to be included in an RRP. For example, L may be 1 or a specific value of 2 or more.

For example, if a CRS for an antenna port 0 is used for an RRP determination (in the case of a common CP), UE determines whether an average received power value of 2 CRS REs in the first OFDM symbol (l=0) of a first slot is greater than or equal to a threshold, and determines that the detection of the CRS is successful if the average received power value is greater than or equal to the threshold. Furthermore, the UE determines whether an average received power value of 2 CRS Res in the fifth OFDM symbol (l=4) of the first slot is greater than or equal to the threshold, and determines that the detection of the CRS is successful if the average received power value is greater than or equal to the threshold. Likewise, the UE determines whether the detection of the CRS is successful with respect to a second slot in the same manner. As described above, the UE determines whether the detection of a CRS is successful in each OFDM symbol in which the CRS is transmitted, and includes a corresponding subframe in an RRP if the CRS is successfully detected in at least L OFDM symbols of one subframe in which the CRS is transmitted.

As a result, if a power level threshold is set for each OFDM symbol, a subframe, including a specific number of OFDM symbols or more (or all the number of symbols) whose average received power value for CRS REs is greater than or equal to the power level threshold may be determined to belong to an RRP.

7) Another RS Information Capable of a QCL Assumption and the Large-Scale Property of a Wireless Channel Capable of a QCL Assumption at this Time This information is for performing the detection and demodulation of a corresponding RS with a stable reference.

For example, the large-scale property may include one or more of Delay spread, Doppler spread, Doppler shift, Average gain, and Average delay.

In this case, an RS capable of a QCL assumption may be an RS transmitted in the same CC (or cell) as the CC (or cell) of an LTE-U band in which a CRS is transmitted or may be an RS transmitted in another CC (or cell) (e.g., the serving cell of an LTE-A band).

a) RS Information Transmitted in the Same CC and the Large-Scale Property of a Wireless Channel Capable of a QCL Assumption In this case, an RS transmitted in the same CC may be an RS corresponding to a specific preamble/midamble (scrambled by an initialization parameter N_pre_ID).

For example, if a CRS is used for an RRP determination, a QCL assumption may be defined or configured between an antenna port related to the corresponding CRS and an antenna port related to another RS transmitted in the same CC as a CC in which the CRS is transmitted.

For example, in this case, the large-scale property capable of a QCL assumption may be {Doppler spread, Doppler shift}.

Furthermore, in this case, an RS corresponding to a preamble/midamble may have the same form as that of the sequence of an existing PSS/SSS. In this case, a conventional PSS/SSS and CRS for a specific cell are capable of a QCL assumption with respect to all of large-scale properties. In contrast, in this case, the transmission of the preamble in a plurality of cells (i.e., transmission in a single-frequency network (SFN) form) may have been taken into consideration. Accordingly, a conventional operation may be modified and applied so that a QCL assumption is applied to only the {Doppler spread, Doppler shift} characteristics.

b) RS Information Transmitted in Another CC and the Large-Scale Property of a Wireless Channel Capable of a QCL Assumption at this Time That is, a QCL assumption may be defined or configured between an antenna port related to a CRS and an antenna port related to another RS transmitted in a CC different from a CC in which the CRS is transmitted.

For example, in the case of a specific RS of the different CC, a QCL with the CRS of a serving cell corresponding to a CC on which higher layer signaling including such RRP configuration information is transferred, a QCL with the CRS of a serving cell corresponding to the PCell of corresponding UE, and a QCL with the CRS of a serving cell corresponding to a specific CC (indicated by an eNB) may be indicated to be applied.

Characteristically, when a QCL assumption is applied between the RSs of different CCs (i.e., between antenna ports) as described above (e.g., an environment in which both corresponding different CCs are transmitted in the same location (co-located) (e.g., transmission in the same eNB/TP)), a QCL assumption may be defined or configured so that it is applied to only the characteristics of {Doppler shift} or {Doppler spread, Doppler shift}.

For example, UE may derive the Doppler shift value $\hat{f}_{D,Scell}$ of a corresponding SCell by correcting Doppler shift estimation value $\hat{f}_{D,Pcell}$ estimated from the CRS of a PCell based on a ratio between the center frequency $f_{Pcell}$ of the PCell and the center frequency $f_{Scell}$ of a corresponding LTE-U band (SCell) through such information. Accordingly, detection performance for the corresponding SCell CRS can be improved. This may be expressed in Equation 15 below.

$$\hat{f}_{D,Scell} = g\left(\hat{f}_{D,Pcell} \cdot \frac{f_{Scell}}{f_{Pcell}}\right) \quad \text{[Equation 15]}$$

In Equation 15, the function g includes a corresponding factor and means that it may include other additional correction term or coefficient.

In the case of Doppler spread, if a QCL assumption is indicated to be applied, detection performance of a corresponding RS can be improved using such information in a similar manner.

Furthermore, in this case, additionally, in an environment in which a difference between the (center) frequencies of different CCs is not greater than a specific level, the characteristics of at least one of {Delay spread, Average delay} may be additionally defined or configured so that a QCL assumption is possible. That is, if a difference between the (center) frequencies of different CC is not greater than a specific level, the characteristics of at least one of {Delay spread, Average delay} may be subjected to a QCL assumption in addition to the characteristics of {Doppler shift} or {Doppler spread, Doppler shift}.

Information Related to a Preamble/Midamble to be Subjected to Blind Detection in an (Optionally) LTE-U Band For a purpose such as the detection of a plurality of cell clusters, pieces of the following information may be configured into one set and preamble-related information may be provided using two or more sets.

1) A Preamble Sequence Scrambling Initialization Parameter

For example, N_pre_ID (0 to X). In this case, X may be fixed to 503 or may be a value which is separately designated.

2) Information for Identifying the Boundary of a Radio Frame

For example, a slot number offset or subframe offset value in comparison with a reference cell timing may be provided.

In this case, the reference cell may be previously fixed to a specific cell or may be designated by an eNB.

For example, the reference cell may be defined as the serving cell of a CC on which higher layer signaling including such RRP configuration information is transferred. Furthermore, the reference cell may be defined as a serving cell corresponding to the PCell of corresponding UE. Furthermore, explicit indication (e.g., a cell ID or index ("ServCellIndex")) indicating that the serving cell of a specific CC is designated as a reference cell may be provided.

In this case, if a floating radio frame boundary to be described is applied, information providing notification of the boundary of a radio frame may be omitted because the boundary of the radio frame is started (i.e., a subframe index and a slot number increase from #0) it is increased from a point of time at which CRC is detected and after a specific offset from the point of time at which CRC is detected.

Furthermore, if a reference cell and the boundary of a radio frame have been aligned, information providing notification of the boundary of the radio frame may be omitted.

3) Information about the Transmission Bandwidth of a Preamble

Information about the transmission bandwidth of a preamble may be indicated by the number of RBs.

Furthermore, the transmission bandwidth of a preamble may be fixed to Y RBs, for example. For example, the transmission bandwidth of a preamble may be Y=6, which is the same as that of a conventional synchronous signal.

4) Power Level Threshold Information for an RRP Determination

This information means corresponding power level threshold information by which a corresponding preamble is determined to have been detected when an average received power value of the REs of a preamble is greater than or equal to a specific threshold value.

If a corresponding preamble is determined to have been detected by the detection condition, the blind detection of another cell/TP-specific RS, such as a CRS or a CSI-RS, may be performed on a subsequent consecutive subframe.

The aforementioned RS QCL assumption between different CCs may be identically applied between two or more (licensed band) bands (or component carriers) in common in addition to an LTE-U band.

That is, in order to perform the detection (and demodulation) of a specific RS in a CC1 with a stable reference, a QCL assumption with a specific RS in a CC2 may be defined or configured to be possible. In other words, a QCL assumption may be set to be possible between an antenna port related to the specific RS in the CC1 and an antenna port related to the specific RS in the CC2.

In this case, the RS may correspond to a synchronous signal, a CRS, a CSI-RS, a DM-RS, an MBSFN RS, a PRS, etc.

As described above, the large-scale property of a wireless channel in which a QCL assumption between the RSs of different CCs may be applied may be defined or configured so that it is applied (e.g., an environment in which both corresponding different CCs are in the same location (co-located) (e.g., transmission in the same eNB/TP)) to only the characteristics of {Doppler shift} or {Doppler spread, Doppler shift}.

In this case, additionally, in an environment in which a difference between the (center) frequencies of different CCs is not greater than a specific level, the characteristics of at least one of {Delay spread, Average delay} may be additionally defined or configured to be capable of a QCL assumption. That is, if a difference between the (center) frequencies of different CCs is not greater than a specific level, the characteristics of at least one of {Delay spread, Average delay} may be subjected to a QCL assumption in addition to the characteristics of {Doppler shift} or {Doppler spread, Doppler shift}.

In a proposed embodiment of the present invention, if a subframe in which UE has succeeded in blind detection in an LTE-U band includes a specific preamble/midamble and/or an RS, an operation for enabling the corresponding subframe to be recognized as the start subframe (i.e., subframe index #0) of a radio frame may be defined or configured.

Furthermore, if the preamble/midamble and/or the RS is detected at a predetermined specific location, such as that the preamble/midamble and/or the RS is detected right before the corresponding subframe, an operation for enabling the corresponding subframe to be recognized as the start subframe (i.e., subframe index #0) of a radio frame may be defined or configured. For example, a subframe after a predetermined specific time (e.g., after x OFDM symbols) since a point of time at which a preamble was detected may be recognized as the start subframe of a radio frame.

For example, a corresponding preamble/midamble may be present at a predetermined time period location and/or a predetermined frequency band, such as a specific fixed OFDM symbol index(s). For example, a conventional PSS/SSS sequence changed in the same form or some modified form may be applied as a corresponding preamble/midamble. Accordingly, the boundary of a radio frame (i.e., the boundary of the start subframe of a radio frame) may be determined from a point of time at which a preamble/midamble is transmitted (or detected) or after a specific time from the point of time at which a preamble/midamble is transmitted (or detected).

Alternatively, UE may perform the operation for determining the start point of an RRP by directly performing blind detection on the CRS of a subframe #0 without a preamble/midamble without being dependent on a preamble/midamble. For example, if the boundary of a subframe or symbol has been aligned with another CC (e.g., PCell), UE may determine the start point of an RRP by only a CRS without a preamble/midamble.

In this case, in order to reduce the complexity of blind detection, the range (e.g., 0.5 ms) of a time and/or frequency error may be previously determined.

Such a range of a time and/or frequency error may be transferred to UE through network signaling or may be previously defined or set based on a UE assumption.

In this case, if the UE performs blind detection based on only a CRS (or a CSI-RS), It is necessary to allow the UE to acquire rough timing because a synchronous signal, such as a PSS whose timing acquisition is performed at the first stage is not present.

Accordingly, information related to the range of a time and/or frequency error may be defined or set as such information, thereby being capable of helping the blind detection of UE.

In this case, if clear channel assessment (CCA) is determined at a point of time that deviates from an error range from a time viewpoint, the eNB may give up (or drop) the transmission of a signal.

Through such an operation, in an LTE-U band, the boundary of a radio frame is not fixed, and an eNB can determine that a wireless channel of an LTE-U band is idle. Accordingly, a floating radio frame boundary of a form in which a radio frame is started (e.g., transmission starts from a subframe index #0) from a point of time at which the transmission of a downlink frame is started may be applied. This is described in more detail with reference to FIG. 20.

Figure 20:
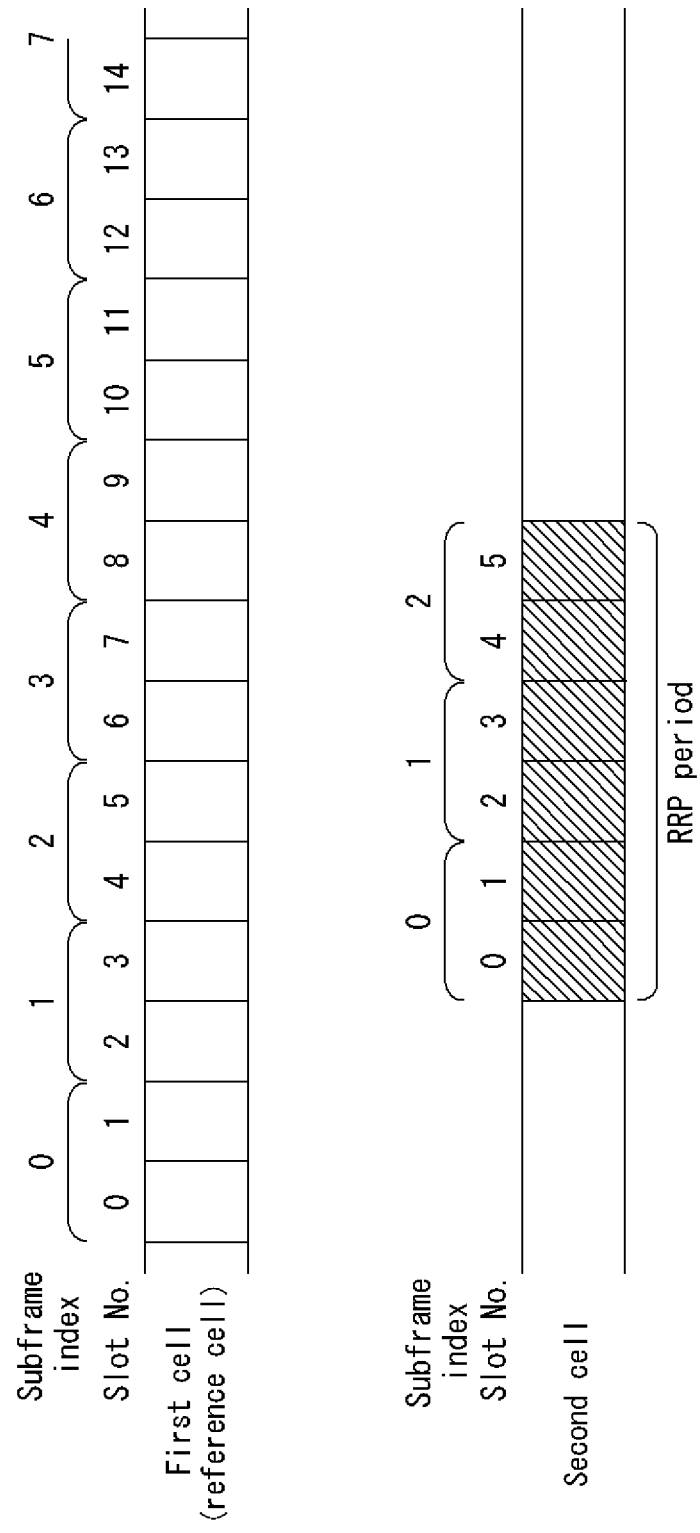
FIGS. 20 and 21 are diagrams illustrating a floating radio frame boundary according to an embodiment of the present invention.

FIG. 20 is a diagram illustrating a floating radio frame boundary according to an embodiment of the present invention.

In FIG. 20, a first cell denotes a reference cell (e.g., a PCell or specific serving cell in a licensed band), and a second cell denotes a cell in which an RRP is set in an unlicensed band/spectrum.

As described above, an RRP may be started from a subframe in which a preamble/midamble and/or an RS (e.g., a CRS or a CSI-RS) was transmitted or an RRP may be started after a predetermined specific time interval from a point of time at which a preamble/midamble and/or an RS was transmitted.

Furthermore, as shown in FIG. 20, a radio frame may be started from a point of time at which an RRP is started.

Accordingly, in all of subframe indices and slot numbers defined within one radio frame, the subframe index has been configured or defined to increase from #0 and the slot number also has been configured or defined to increase from #0 based on the start point of a corresponding radio frame. Accordingly, RSs, such as a CRS, a CSI-RS, a DMRS, an SRS, etc. are subjected to sequence generation based on a parameter, such as a slot number "n_s" determined based on the boundary of a radio frame variably determined as described above. Accordingly, UE can detect corresponding RSs.

For example, it is assumed that a CSI-RS has a 5 ms cycle and has been configured to be transmitted in a subframe #1 and a subframe #6.

In this case, if the subframe index of a reference cell is identically applied in the RRP of a cell in an unlicensed band/spectrum, the location of a subframe in which a CSI-RS is transmitted is irregularly determined in the RRP based on the index of the subframe in which the RRP is started. For example, if an RRP is started from a subframe #0, a CSI-RS is immediately transmitted in a next subframe (i.e., a subframe #1). If the RRP is started from a subframe #2, the CSI-RS is transmitted after a fourth subframe (i.e., a subframe #6) and transmitted relatively late. Accordingly, there may be a problem when UE performs channel estimation.

In contrast, if the boundary of a radio frame is started from a point of time at which an RRP is started as in FIG. 20, the point of time at which the RRP is started is always a subframe #0 and thus a CSI-RS is always transmitted in a next subframe (i.e., a subframe #1). Accordingly, the location of CSI-RS transmission resources is regularly determined. Accordingly, UE can predict a point of time at which a CSI-RS is transmitted and thus can perform channel estimation more efficiently.

Furthermore, in the case of a CRS, a CRSsequence is differently generated depending on a slot number in which a CRS is transmitted. Accordingly, if the subframe index of a reference cell is identically applied in the RRP of a cell in an unlicensed band/spectrum, a CRSsequence is differently generated depending on a slot number in which a CRS is transmitted. In this case, there is a disadvantage in that it is difficult for UE to accurately detect a CRS if the boundary of a subframe or symbol is not precisely aligned with a reference cell.

In contrast, if the index of a subframe in which a CRS is detected is #0 and a slot number is #0 as shown in FIG. 20, an eNB always sends the CRS based on the slot number 0 at a point of time at which an RRP is started. Accordingly, UE can detect the CRS more accurately because it performs blind detection on a CRSsequence based on the slot number 0.

Figure 21:
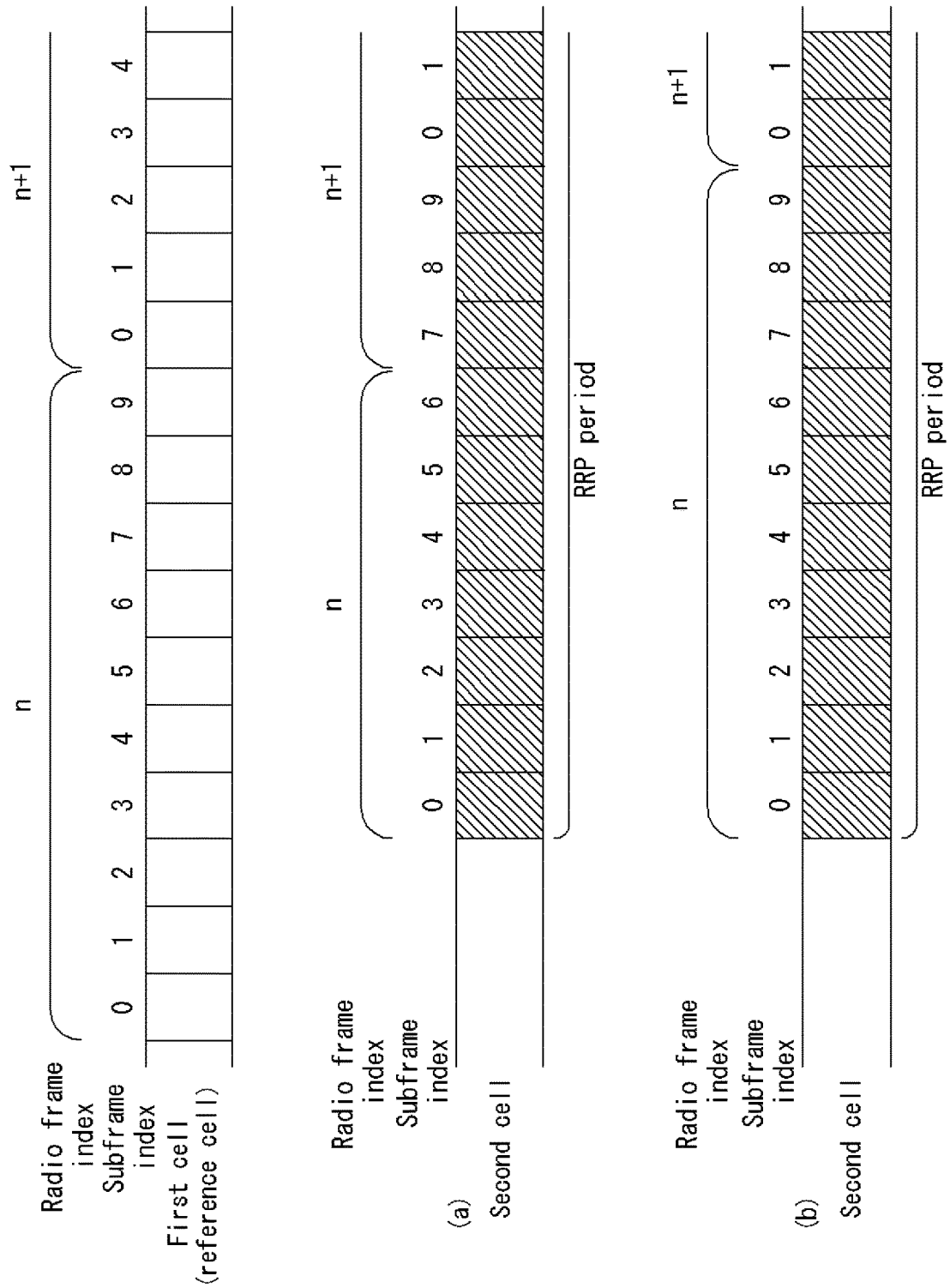

FIG. 21 is a diagram illustrating a floating radio frame boundary according to an embodiment of the present invention.

In FIG. 21, a first cell denotes a reference cell (e.g., a PCell or specific serving cell in a licensed band), and a second cell denotes a cell in which an RRP has been configured in an unlicensed band/spectrum.

In addition to the aforementioned blind detection of a floating radio frame boundary, UE may perform an operation for increasing the value of a radio frame number (n_f) parameter in a corresponding LTE-U band at a specific interval (e.g., an interval of 10 ms) with reference to PCell timing or timing of a specific reference cell (e.g., a specific cell configured by an eNB or previously defined as described above).

For example, as shown in FIG. 21(a), UE may increase the value of a radio frame number "n_f" parameter in an LTE-U band identically with the radio frame number of a reference cell.

Accordingly, regardless of an increase in a subframe index and symbol number in an LTE-U band, the value of the radio frame number (n_f) parameter may be increased in the LTE-U band at the same point of time at a point of time at which the value of the parameter "n_f" is increased in a reference cell. That is, both a subframe index and a slot number are increased from #0 because a floating radio frame boundary is determined at a point of time at which it was obtained by blind detection, but a next radio frame boundary may comply with timing of the reference cell.

Furthermore, as shown in FIG. 21(b), UE may increase the value of the radio frame number (n_f) parameter in an LTE-U band independently of a reference cell.

The value of the radio frame number (n_f) parameter itself continues to increase at a fixed interval (e.g., 10 ms) as in a conventional technology (the first cell in FIG. 21).

Furthermore, when UE obtains a floating radio frame boundary in an LTE-U band through blind detection, both a subframe index and a slot number increase from #0 at a corresponding point of time. Furthermore, the value of the radio frame number (n_f) parameter can maintain the same value without being changed until the time period (e.g., 10 ms) of one radio frame is terminated in the LTE-U band from this time.

That is, in the situation in which the value of the radio frame number (n_f) parameter increases at a fixed interval, when the floating radio frame boundary is obtained by blind detection in the value state ("n" in FIG. 21(b)) of a specific value of the parameter "n_f", the slot number is initialized as #0 from a corresponding point of time. Furthermore, while the slot number increases up to #19, a current value of the radio frame number (n_f) parameter ("n" in FIG. 21(b)) remains intact. The value of the radio frame number (n_f) parameter increases again ("n+1" in FIG. 21(b)) until a next slot number becomes #0 again.

Such an operation is applied until a point of time at which a corresponding RRP is terminated. The value of the radio frame number (n_f) parameter complies with the value of the parameter "n_f" (i.e., the value of the parameter "n_f" in the reference cell) fixed at the fixed interval from a point of time at which the RRP is terminated. Furthermore, likewise, a subframe index and a slot number in the reference cell may follow from the point of time at which the RRP is terminated.

As a result, the radio frame number of a CC (or cell) in an LTE-U band is sequentially increased at the radio frame interval of an LTE-A band from the boundary of a floating radio frame regardless of the radio frame number of the CC (or cell) in the LTE-A band.

If a CA of a plurality of CCs (or cells) is configured in UE in an LTE-U band, an operation for determining a floating radio frame boundary separately from a radio frame boundary fixed in an LTE-U band as described above may be applied to each CC (or cell) configured in the LTE-U band. That is, an RRP may be independently determined for each CC (or cell) configured in the LTE-U band, and the boundary of a radio frame may be independently determined from a point of time at which the predetermined RRP is started.

Through the method, UE may not perform blind detection during a specific time (e.g., X msec) from the moment when the UE obtains a floating radio frame boundary through blind detection. That is, a blind detection operation may be stopped during a specific time. Furthermore, the UE may be defined or configured to recognize that an RRP is maintained during at least specific time and to perform a normal downlink reception and uplink transmission operation.

In this case, the specific time may be previously defined in a radio frame, subframe or slot unit or may be set by an eNB. As a representative example, the specific time may be X=5 (msec) or may be previously defined as X=10 (msec) or may be set by an eNB. In some embodiments, the specific time may be previously defined as other values or may be set by an eNB.

In this case, if a CA of a plurality of CCs (or cells) is configured in UE in an LTE-U band, a specific time during which UE does not perform blind detection on each CC (or cell) may be independently determined.

Accordingly, when UE obtains a floating radio frame boundary, it does not need to perform blind detection during at least X time msec. Accordingly, there is an advantage in that energy of UE can be reduced.

Furthermore, resources configured to have a specific cycle, such as a CSI-RS and CSI-interference measurement (IM), are located as a relative subframe offset value for the point of time of the floatingly obtained radio frame boundary. Accordingly, there is an advantage in that the locations of major resources, such as an RS, can be regularly determined within an obtained RRP in an environment in which the acquisition of a constant RRP is not guaranteed, such as an LTE-U band.

Furthermore, if a floating radio frame boundary is configured separately from a radio frame boundary fixed in an LTE-U band as described above, in the case where HARQ ACK/NACK is transmitted in another band (e.g., a PCell) other than a corresponding LTE-U band, there may be a problem in that HARQ timelines (i.e., ACK/NACK transmission timing and retransmission data transmission timing) are tangled due to the floating radio frame boundary.

Furthermore, if a CA of a plurality of CCs (or cells) is configured in UE in an LTE-U band, when HARQ ACK/NACK for data transmitted in one CC (or cell) is transmitted in another CC (or cell), HARQ timelines may be tangled due to a floating radio frame boundary independently configured for each CC (or cell).

Accordingly, as described above, if different CCs (or cells) support a single signaling operation (e.g., if an HARQ ACK/NACK operation is supported), the timeline of the corresponding signaling operation may be determined based on any one specific CC (or cell).

For example, if the timeline (e.g., HARQ timeline) of a specific signaling operation operates along with different CCs (or cells), the timeline may be determined based on timing of a reference cell.

This is described in more detail. If a different CC (or cell) and a specific timeline (e.g., HARQ timeline) operate in a specific CC (or cell) configured in an LTE-U band, a subframe index (or a slot number) may be determined with reference to timing of a reference cell (e.g., a PCell or specific cell in a licensed band). As a result, an HARQ timeline may be defined based on subframe indices #0~#9 and slot numbers #0~#19 defined within the radio frame boundary of a fixed interval (e.g., 10 ms) based on the value of a radio frame number "n_f" parameter which is increased at the corresponding fixed interval in a corresponding LTE-U band.

For example, in the example of FIG. 21(b), it is assumed that UE receives downlink data in the subframe #2 of a radio frame number "n" in a second cell and sends corresponding ACK/NACK in a first cell. In this case, the subframe #2 of the radio frame number "n" in the second cell is the same point of time as that of the subframe #5 of the radio frame number "n" in the first cell (i.e., a reference cell), which is increased at a fixed interval. Accordingly, the UE may send the ACK/NACK in the subframe #9 (i.e., a subframe after the fourth subframe) of the radio frame number "n" in the first cell (i.e., the reference cell).

As a result, if a serving cell in an unlicensed band/spectrum and a cell in a licensed band together support an HARQ operation, a point of time at which ACK/NACK is transmitted (or a point of time at which ACK/NACK is retransmitted) may be determined based on the radio frame boundary of a specific cell in a licensed band.

Furthermore, likewise, if a CA of a plurality of CCs (or cells) is configured in UE in an LTE-U band, when HARQ ACK/NACK for data transmitted in one CC (or cell) is transmitted in a different CC (or cell), an HARQ timeline may be determined based on the radio frame boundary of a specific CC (or cell) in the LTE-U band.

Furthermore, a TDD system may be defined or configured to apply a subframe index fixed at a fixed interval as described above with respect to a subframe index to which the UL/DL configuration (refer to Table 1) is applied.

For example, in the example of FIG. 21(b), in the case of a TDD system, the subframe index in Table 1 may indicate the subframe index of the first cell. Furthermore, in the second cell, each uplink, downlink or special subframe may be reserved with reference to the subframe index of the first cell corresponding to the same point of time.

As a result, the radio frame number "n_f", subframe index, and slot number "n_s" recognized and calculated by UE may basically include different values of two sets. Whether UE independently calculates/maintains parameter values corresponding to the two sets in parallel and has to apply a parameter value that belongs to any one of the two sets for each specific operation may be differently defined or configured.

For example, in the set 1 {radio frame number "n_f", subframe index, and slot number "n_s"}, as described above, the radio frame number "n_f" is increased at an always constant interval (e.g., 10 ms) in an LTE-U band based on timing of a specific reference cell (e.g., a PCell or a specific serving cell), and subframe indices #0~#9 and slot numbers "n_s" (#0~#19) are assigned to respective radio frame numbers "n_f."

Furthermore, in the set 2 {radio frame number "n_f", subframe index, slot number "n_s"}, as described above, the radio frame number "n_f" is obtained based on a floating radio frame boundary obtained by blind detection of UE, and subframe indices #0~#9 and slot numbers "n_s" (#0~#19) are assigned within the floating radio frame obtained as described above. In this case, at the start point of the floating radio frame boundary, the radio frame number "n_f" in the set 1 may continue for a specific time (e.g., X msec) in the future.

An operation to be recognized by UE in a form, such as that described above, and to which a parameter corresponding to each set may be applied may be differently defined or configured.

Furthermore, as described above, if a CA of a plurality of CCs (or cells) is configured in UE in an LTE-U band, the above floating radio frame boundary may be independently determined for each CC (or cell). Accordingly, the set 2 may be determined for each CC (or cell). That is, in this case, UE can recognize the set 1 according to timing increasing at a specific interval in an LTE-U band and a plurality of the sets 2.

In addition, if blind detection for a floating radio frame boundary fails as in the set 2, a subsequent RRP (e.g., during fixed X msec) may not be correctly obtained.

Accordingly, in order to supplement such a disadvantage, a method for increasing the detection probability of UE by applying separate power boosting to a preamble/midamble and/or an RS, such as a CRS in a specific subframe (e.g., a subframe #0) within a floating radio frame may be applied.

Furthermore, to apply power boosting to a preamble/midamble and/or a CRS in a specific subframe within a floating radio frame may be previously defined in UE or may be set by an eNB.

If CRS power of a specific subframe (e.g., a subframe #0) is boosted as described above, a separate parameter (e.g., P_A and/or P_B) to be specially applied in the corresponding subframe may be provided to UE. Such a parameter may be provided through higher layer signaling. Furthermore, such a parameter may be included in the "RRP configuration information" and transmitted.

In this case, P_A and P_B are parameters for determining a ratio of a CRS energy per resource element (EPRE) and a PDSCH EPRE for each OFDM symbol. The parameter P_A is a UE-specific parameter, and the parameter P_B is a cell-specific parameter.

Accordingly, a power ratio between a PDSCH and a CRS (a PDSCH-to-CRS power ratio) in an OFDM symbol in which a corresponding power-boosted CRS is transmitted may be different. UE is notified of such parameters so that the UE applies the parameters to the demodulation of a PDSCH. As described above, in each OFDM symbol, a ratio of a PDSCH EPRE and the CRS EPRE in a PDSCH RE may be determined depending on an OFDM symbol index and/or the number of CRS transmission antenna ports.

Furthermore, reference signal power "referenceSignalPower", for example, may be transmitted through higher layer signaling. In this case, the reference signal power parameter provides a downlink RS EPRE. Accordingly, transmission power of a CRS transmitted in a specific subframe may be determined.

Furthermore, what a special subframe (e.g., a subframe #0) having the meaning of the start subframe of an RRP cannot become an MBSFN subframe (i.e., the special subframe is always a non-MBSFN subframe) may be previously defined or may be set by an eNB. Accordingly, the detection and demodulation performance of a CRS in a corresponding subframe can be guaranteed in a specific level or more because the number of transmitted OFDM symbols in a CRS is guaranteed to be at least Z (e.g., Z=4) in the corresponding subframe (i.e., the subframe #0).

The operation for dividing the set of the radio frame number "n_f", subframe index, and slot number "n_s" into the set 1 and the set 2 (one or more sets 2) and determining a floating radio frame boundary as in the set 2 is not limitedly applied to an unlicensed band/spectrum, such as an LTE-U band. That is, the operation may be applied to a CA situation between common licensed bands.

In a case, such as a case wherein time domain inter-cell interference coordination (ICIC) is applied, the interference levels of two subframe (e.g., a protected subframe and a not-protected common subframe) may have a great influence on the results of the measurement of UE because the interference levels are significantly different.

An operation of UE related to measurement influenced as described above includes radio link monitoring (RLM) measurement, radio resource management (RRM) measurement (e.g., measurement, such as reference signal receive power (RSRP), a received signal strength indicator (RSSI) and/or reference signal received quality (RSRQ)) and channel state information (CSI) measurement (e.g., measurement, such as a CQI, PMI, RI and/or PTI).

For restricted measurement, an eNB signals a restricted measurement resource pattern to UE.

For example, in restricted RLM and RRM measurement for a serving cell, a network may configure a restricted measurement resource pattern in UE. Accordingly, the UE performs restricted measurement using resources indicated by the restricted measurement resource pattern for the RLM and RRM measurement for the serving cell.

Furthermore, in restricted RRM measurement for a neighbor cell, a network may configure a restricted measurement resource pattern different from a resource pattern, which is used for restricted RLM and RRM measurement for a serving cell, in UE. Accordingly, the UE performs restricted measurement using resources indicated by the restricted measurement resource pattern for the restricted RRM measurement for the neighbor cell.

When a restricted measurement resource pattern is configured for RRM measurement for a neighbor cell, a list of physical cell IDs of respective neighbor cells is also provided to UE. The UE applies restricted measurement to the listed cells only and applies common measurement to other cells. The reason for this is that unnecessary restricted measurement is not applied to a neighbor cell whose interference is not a problem and restricted measurement is applied to only a neighbor cell whose interference is problematic.

CSI measurement is described below. UE averages the results of channel and interference estimation for a plurality of subframes in order to derive CSI feedback. In order for UE to not average interference for two different subframe types, an eNB may configure a set of 2 subframes and perform a configuration so that the UE averages channels and interference for a subframe belonging to one subframe set and does not average different subframe sets. Furthermore, the UE reports separate CSI measurement for the set of 2 subframes. The UE may periodically report CSI measurement according to a report cycle set in each subframe set or may report one of CSI measurement for the set of two subframes through a PUSCH when the report is triggered by a PDCCH.

As described above, UE can autonomously recognizes a period in which a cell/TP-specific RS (e.g., a CRS, a CSI-RS, etc.) and/or a preamble/midamble is detected in an LTE-U band as an RRP through assistant signaling (i.e., RRP configuration information) or without assistant signaling.

That is, UE can directly determine an RRP in an LTE-U band through the aforementioned blind detection operation in addition to a case where a scheduling grant is separately received from an eNB. Accordingly, the UE can perform CSI, RRM and/or RLM measurement on the RRP determined as described above in a restricted measurement form within the RRP.

The reason for this is that a correct measurement operation according to an unpredictable change of an RRP in an LTE-U band cannot be performed using a condition in which restricted measurement is performed on only a specific subframe set semi-statically provided as in existing restricted measurement.

Accordingly, UE can perform CSI, RRM and/or RLM restricted measurement only in a subframe corresponding to a subframe set in which CSI, RRM and/or RLM measurement has to be performed within an RRP determined by blind detection. A subframe set or time period in which restricted measurement is performed is hereinafter referred to as a "restricted measurement object", as described above.

Hereinafter, an operation of UE for such an RRP-dependent restricted measurement method is described below.

Figure 22:
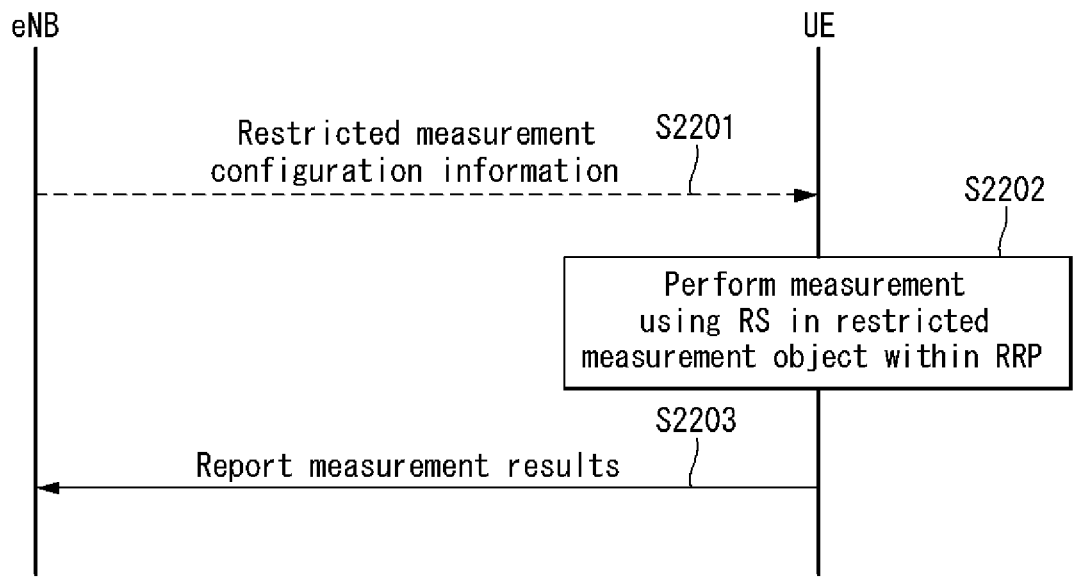
FIG. 22 is a diagram illustrating a method for sending and receiving data in an unlicensed band/spectrum according to an embodiment of the present invention.

FIG. 22 is a diagram illustrating a method for sending and receiving data in an unlicensed band/spectrum according to an embodiment of the present invention.

Referring to FIG. 22, an eNB sends configuration information for restricted measurement to UE at step S2201.

The configuration information for restricted measurement is necessary for the UE to perform CSI, RRM and/or RLM restricted measurement within the RRP of an unlicensed band/spectrum.

The configuration information for restricted measurement may be transferred to the UE through higher layer signaling (e.g., RRC signaling) or dynamic indication (e.g., a DCI including corresponding aperiodic CSI triggering).

The configuration information for restricted measurement may include a restricted measurement object, that is, a time period or subframe which is an object on which the UE will perform CSI, RRM and/or RLM restricted measurement.

Furthermore, the configuration information may include information for enabling the UE to determine the restricted measurement object. For example, a specific threshold value related to average received power in a specific time unit (e.g., a subframe or an OFDM symbol) with respect to a specific RS (e.g., a CRS or a CSI-RS) which is used for the UE to perform the restricted measurement object may correspond to the configuration information.

If the restricted measurement object and the configuration information for restricted measurement, such as threshold value of an RS may be previously defined. In this case, configuration information for restricted measurement by the eNB may not be provided. That is, step S2201 may be omitted.

The UE performs measurement using a specific RS (e.g., a CRS, a CSI-RS, etc.) in a restricted measurement object within an RRP at step S2202) and reports the results of the measurement to the eNB at step S2203.

This is described in more detail. CSI and/or RRM measurement in a specific CC, such as an LTE-U band, may be defined or may be set by an eNB so that restricted measurement is performed on only a time period(s) determined to be an RRP based on separate assistant signaling or by the blind detection of a preamble/midamble (e.g., an SS) and/or RS of UE without separate assistant signaling.

In this case, specific subframe set(s) information (i.e., restricted measurement configuration information), such as a CSI process configuration, may be transferred to the UE. The restricted measurement may be configured by the eNB or may be previously defined for each subframe set. In this case, the UE may average measurement estimation values for each corresponding subframe set and for only an RRP. That is, the UE averages the results of channel and interference estimation measured in a subframe belonging to one subframe set within one RRP.

In another embodiment, after UE performs blind detection on a specific RS (e.g., a CRS, a CSI-RS, etc.), information (i.e., restricted measurement configuration information) about a specific threshold value to determine a restricted measurement object only when the average received power is greater than or equal to the specific threshold value is may be provided to the UE.

Such a threshold value is a parameter regarding corresponding restricted measurement and may be provided separately from the restricted measurement configuration information.

For example, the threshold value may be indicated in a subframe unit. In this case, when an average received power value of RS REs within each subframe within an RRP is greater than or equal to a corresponding threshold value, UE may determine that the corresponding subframe belongs to a restricted measurement object. Furthermore, the UE may average a measurement estimation value in the restricted measurement object and may report the averaged value to an eNB.

As described above, an RRP is defined to be not essentially limited to a single consecutive time period, but may be defined in the form of a set of a plurality of consecutive time periods.

In this case, a time period, such as a subframe unit satisfying the threshold value or more, may be expressed in the form of a set of a plurality of consecutive time periods. Accordingly, in this case, a maximum time period window in which a measurement estimation value can be averaged by corresponding restricted measurement may be separately defined or may be set by an eNB. In this case, if the maximum time period window is set by the eNB, it may be transferred to UE as the restricted measurement configuration information.

For example, if a corresponding maximum period window is T (ms), it is defined that UE can average a measurement estimation value for corresponding restricted measurement with respect to all of a plurality of inconsecutive subframes that satisfies the threshold value condition during the time period.

As described above, an RRP may determine a floating radio frame boundary, and a radio frame number "n_f", a subframe index, and a slot number "n_s" may be classified into two sets. In this case, a restricted measurement object configured by UE may be determined based on timing according to a fixed radio frame boundary, that is, the radio frame number "n_f", the subframe index, and the slot number "n_s." For example, a restricted measurement object configured in UE may be determined with reference to a subframe index determined at a fixed interval, and the UE may perform measurement in a subframe of an unlicensed band/spectrum cell corresponding to the same point of time.

Figure 23:
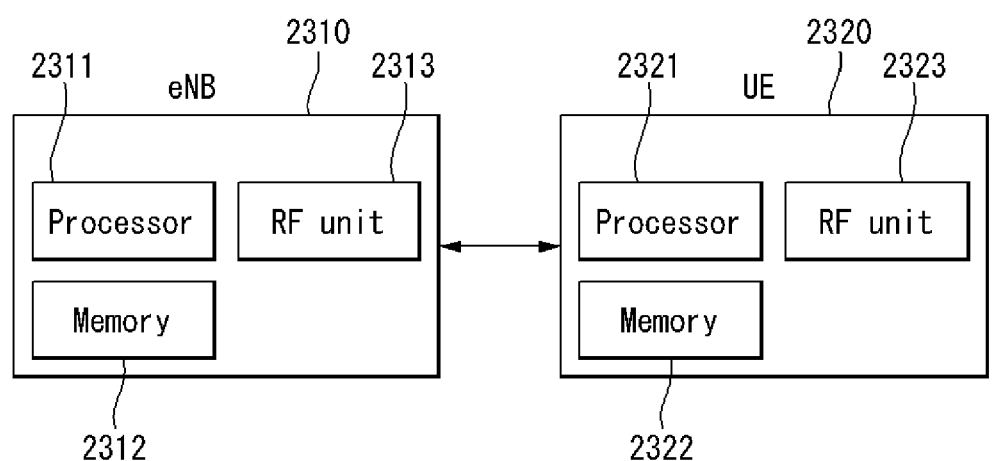
FIG. 23 illustrates a block diagram of a wireless communication apparatus according to an embodiment of the present invention.

General Apparatus to which an Embodiment of the Present Invention May be Applied FIG. 23 illustrates a block diagram of a wireless communication apparatus according to an embodiment of the present invention.

Referring to FIG. 23, the wireless communication system includes an eNB 2310 and a plurality of pieces of UE 2320 located within the area of the eNB 2310.

The eNB 2310 includes a processor 2311, memory 2312, and a radio frequency (RF) unit 2313. The processor 2311 implements the functions, processes and/or methods proposed in FIGS. 1 to 22. The layers of a wireless interface protocol may be implemented by the processor 2311. The memory 2312 is connected to the processor 2311 and stores various pieces of information for driving the processor 2311. The RF unit 2313 is connected to the processor 2311 and transmits and/or receives a radio signal.

The UE 2320 includes a processor 2321, memory 2322, and an RF unit 2323. The processor 2321 implements the functions, processes and/or methods proposed in FIGS. 1 to 22. The layers of a wireless interface protocol may be implemented by the processor 2321. The memory 2322 is connected to the processor 2321 and stores various pieces of information for driving the processor 2321. The RF unit 2323 is connected to the processor 2321 and transmits and/or receives a radio signal.

The memory 2312, 2322 may be inside or outside the processor 2311, 2321 and connected to the processor 2311, 2321 by various well-known means. Furthermore, the eNB 2310 and/or the UE 2320 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

A scheme for sending and receiving data in an unlicensed band in a wireless communication system according to an embodiment of the present invention has been chiefly illustrated as being applied to a 3GPP LTE/LTE-A system, but may be applied to various wireless communication systems in addition to the 3GPP LTE/LTE-A system.

The invention claimed is:

1. A method for measuring, by a user equipment (UE), a channel in a wireless communication system, the method comprising:
    determining a specific occupancy period for receiving a signal on a secondary cell (SCell) of an unlicensed band;
    receiving, from a base station (BS), a channel state information reference signal (CSI-RS) on the SCell of the unlicensed band;
    measuring the channel based on CSI-RSs received in the specific occupancy period; and
    averaging measurements of the channel,
    wherein the specific occupancy period is a time period related to a detection of a cell-specific reference signal (CRS) transmitted by the BS, and
    wherein the specific occupancy period is determined to be a subframe in which an average received power of the CRS is greater than or equal to a specific threshold.

2. The method of claim 1, wherein the specific occupancy period includes consecutive time units.

3. The method of claim 2, wherein a time unit is a subframe or an orthogonal frequency division multiplexing (OFDM) symbol.

4. The method of claim 1, further comprising:
    receiving, from the BS, configuration information comprising a parameter for blind detection of the CRS.

5. The method of claim 4, wherein the configuration information comprises one or more of:
    a sequence scrambling initialization parameter of the CRS,
    information for identifying a radio frame boundary in the SCell of the unlicensed band,
    information for a transmission bandwidth of the CRS,
    information for a power level threshold for determining the specific occupancy period,
    a number of antenna ports in which the CRS is transmitted,
    a multicast-broadcast single-frequency network (MB-SFN) subframe configuration,
    a reference signal capable of a Quasi co-located (QCL) assumption, or
    a large-scale property of a wireless channel.

6. The method of claim 5, wherein, if the power level threshold is set in a subframe unit, a subframe whose average received power value of resource elements in which the CRS is transmitted is greater than or equal to the power level threshold is determined to belong to the specific occupancy period.

7. The method of claim 5, wherein, if the power level threshold is set in an orthogonal frequency division multiplexing (OFDM) symbol unit, a subframe in which a number of OFDM symbols whose average received power value of resource elements in which the CRS is transmitted is greater than or equal to the power level threshold is greater than or equal to a specific number is determined to belong to the specific occupancy period.

8. The method of claim 5, wherein the reference signal capable of the QCL assumption comprises a reference signal transmitted in a cell of a licensed band.

9. The method of claim 8, wherein a Doppler shift value of the SCell of the unlicensed band is derived by correcting a Doppler shift estimation value estimated from the reference signal transmitted in the cell of the licensed band based on a ratio between a center frequency of the cell of the licensed band and a center frequency of the SCell of the unlicensed band.

10. The method of claim 1, wherein a boundary of a floating radio frame is determined with respect to the SCell of the unlicensed band from a point of time at which the CRS is detected or after a specific time from the point of time at which the CRS is detected.

11. The method of claim 10, wherein a radio frame number of the SCell of the unlicensed band is sequentially increased at an interval identical with an interval of a radio frame of a licensed band from the boundary of the floating radio frame regardless of a radio frame number of a cell of the licensed band.

12. The method of claim 10, wherein a blind detection operation is stopped for a specific time from a point of time at which the boundary of the floating radio frame is obtained by the blind detection.

13. The method of claim 10, wherein if both the SCell of the unlicensed band and a cell of a licensed band support a hybrid automatic retransmit request (HARQ) operation, a timeline of the HARQ is determined based on a radio frame boundary of the cell of the licensed band.

14. The method of claim 1, wherein a power boosting is applied to a signal transmitted in a first subframe of the specific occupancy period.

15. The method of claim 1, further comprising:
transmitting, to the BS, information about the averaged measurements of the channel.

16. A user equipment (UE) for measuring a channel in a wireless communication system, the UE comprising:
a radio frequency (RF) unit including a transceiver and configured to transmit and receive a radio signal; and
a processor configured to control the UE,
wherein the processor:
determines a specific occupancy period for receiving a signal on a secondary cell (SCell) of an unlicensed band;
receives, from a base station (BS), a channel state information reference signal (CSI-RS) on the SCell of the unlicensed band;
measures the channel based on CSI-RSs received in the specific occupancy period; and
averages measurements of the channel,
wherein the specific occupancy period is a time period related to a detection of a cell-specific reference signal (CRS) transmitted by the BS, and
wherein the specific occupancy period is determined to be a subframe in which an average received power of the CRS is greater than or equal to a specific threshold.

17. The UE of claim 16, wherein the processor is further configured to transmit, to the BS, information about the averaged measurements of the channel.

* * * * *